United States Patent [19]

Swonk

[11] Patent Number: 5,867,729
[45] Date of Patent: Feb. 2, 1999

[54] SYSTEM FOR RECONFIGURING A KEYBOARD CONFIGURATION IN RESPONSE TO AN EVENT STATUS INFORMATION RELATED TO A COMPUTER'S LOCATION DETERMINED BY USING TRIANGULATION TECHNIQUE

[75] Inventor: Glenn L. Swonk, Mission Viejo, Calif.

[73] Assignee: Toshiba America Information Systems, Inc., Irvine, Calif.

[21] Appl. No.: 915,734

[22] Filed: Aug. 21, 1997

Related U.S. Application Data

[63] Continuation of Ser. No. 518,495, Aug. 23, 1995, abandoned.

[51] Int. Cl.$^6$ .............................. G06F 13/10; G06F 9/24
[52] U.S. Cl. ..................... 395/828; 395/830; 395/887; 345/172
[58] Field of Search ................................ 395/828, 830, 395/887, 186, 500, 651, 281, 750.05, 703, 836; 345/172, 168, 329, 352, 333, 354, 326; 364/709.16; 361/690; 600/523

[56] References Cited

U.S. PATENT DOCUMENTS

| | | | |
|---|---|---|---|
| 4,431,988 | 2/1984 | Molusis et al. ......................... | 345/168 |
| 4,484,304 | 11/1984 | Anderson et al. ...................... | 345/329 |
| 4,689,478 | 8/1987 | Hale et al. ............................. | 235/380 |
| 4,853,888 | 8/1989 | Lata et al. ............................. | 345/172 |
| 4,862,355 | 8/1989 | Newman et al. ....................... | 395/836 |
| 4,862,389 | 8/1989 | Takagi .................................... | 345/354 |
| 4,935,870 | 6/1990 | Burk, Jr. et al. .................... | 395/200.33 |
| 4,937,778 | 6/1990 | Wolf et al. ............................ | 395/887 |
| 4,945,468 | 7/1990 | Carson et al. ......................... | 395/186 |
| 4,964,075 | 10/1990 | Shaver et al. .......................... | 395/887 |
| 5,041,967 | 8/1991 | Ephrath et al. ........................ | 345/352 |
| 5,086,503 | 2/1992 | Chung et al. ........................... | 341/22 |
| 5,088,033 | 2/1992 | Binkley et al. ........................ | 395/500 |
| 5,113,517 | 5/1992 | Beard et al. ............................ | 395/500 |
| 5,121,477 | 6/1992 | Koopmans et al. ..................... | 345/333 |
| 5,179,700 | 1/1993 | Aihara et al. .......................... | 345/326 |
| 5,181,029 | 1/1993 | Kim ........................................ | 341/20 |
| 5,220,675 | 6/1993 | Padawer et al. ........................ | 345/333 |
| 5,241,646 | 8/1993 | Arai ........................................ | 395/500 |
| 5,265,238 | 11/1993 | Canova, Jr. et al. .................. | 395/651 |

(List continued on next page.)

OTHER PUBLICATIONS

Cowart, "Mastering Windows™ 3.1 Special Edition" Sybex Inc., 1993, pp. 24, 697–699, 865–880,.

F.A. Bell, "A Keyboard Enhancer for the IBM Personal Computer", Version 1.1, ©1984.

*Primary Examiner*—Le Hien Luu
*Attorney, Agent, or Firm*—Banner & Witcoff

[57] ABSTRACT

A computer system includes a computer having an event detecting interface for detecting when an event occurs. Based on the occurrence of the event, a keyboard assignment scheme is dynamically reconfigured to an appropriate configuration. The computer also includes a user interface for sensing when a key combination of at least one standard key and a non-standard key of a keyboard is depressed and a look-up table for storing a plurality of key combinations and one or more applications corresponding to each key combination of the active configuration. A non-standard key application control in the computer determines the application corresponding to the depressed key combination according to the active configuration. If the depressed key combination corresponds to one application, the non-standard key application control launches the application via an application program interface. If the depressed key combination corresponds to a plurality of separate applications, the user is presented with a pop-up list to select an application for launching. In addition, the user can define the available configurations by communicating with the non-standard key application control via user dialogs to add or edit configurations thereby selecting the applications launched when a key combination in the defined configuration is depressed.

28 Claims, 21 Drawing Sheets

U.S. PATENT DOCUMENTS

| | | | |
|---|---|---|---|
| 5,276,883 | 1/1994 | Halliwell | 395/200.33 |
| 5,287,514 | 2/1994 | Gram | 345/333 |
| 5,287,526 | 2/1994 | Wolf et al. | 364/709.16 |
| 5,355,892 | 10/1994 | Saltzstein et al. | 600/523 |
| 5,377,261 | 12/1994 | Baals et al. | 379/201 |
| 5,377,357 | 12/1994 | Nishigaki et al. | 395/281 |
| 5,394,552 | 2/1995 | Shirota | 395/750.05 |
| 5,428,791 | 6/1995 | Andrew et al. | 395/703 |
| 5,463,742 | 10/1995 | Kobayashi | 395/281 |
| 5,485,614 | 1/1996 | Kocis et al. | 345/168 |

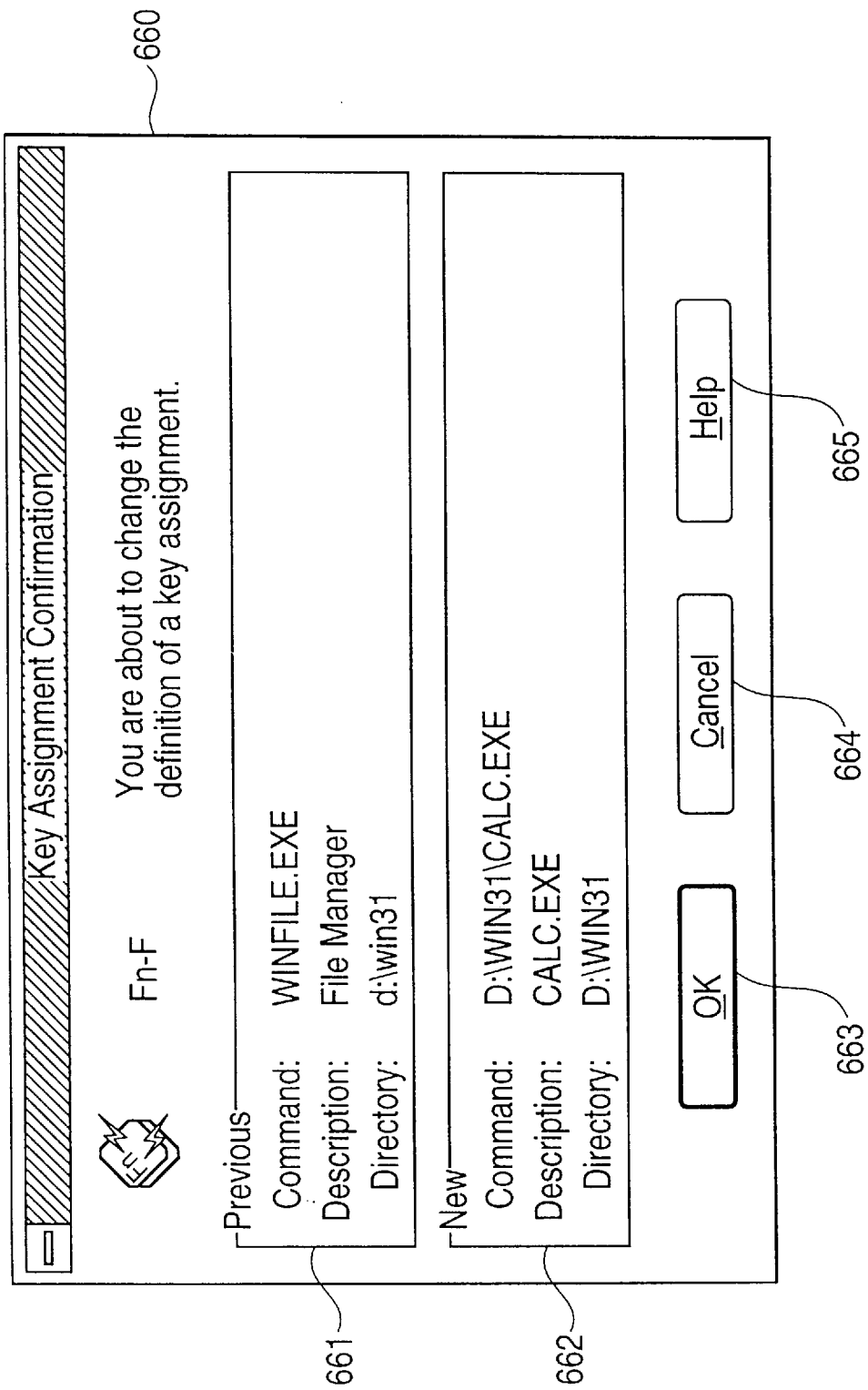

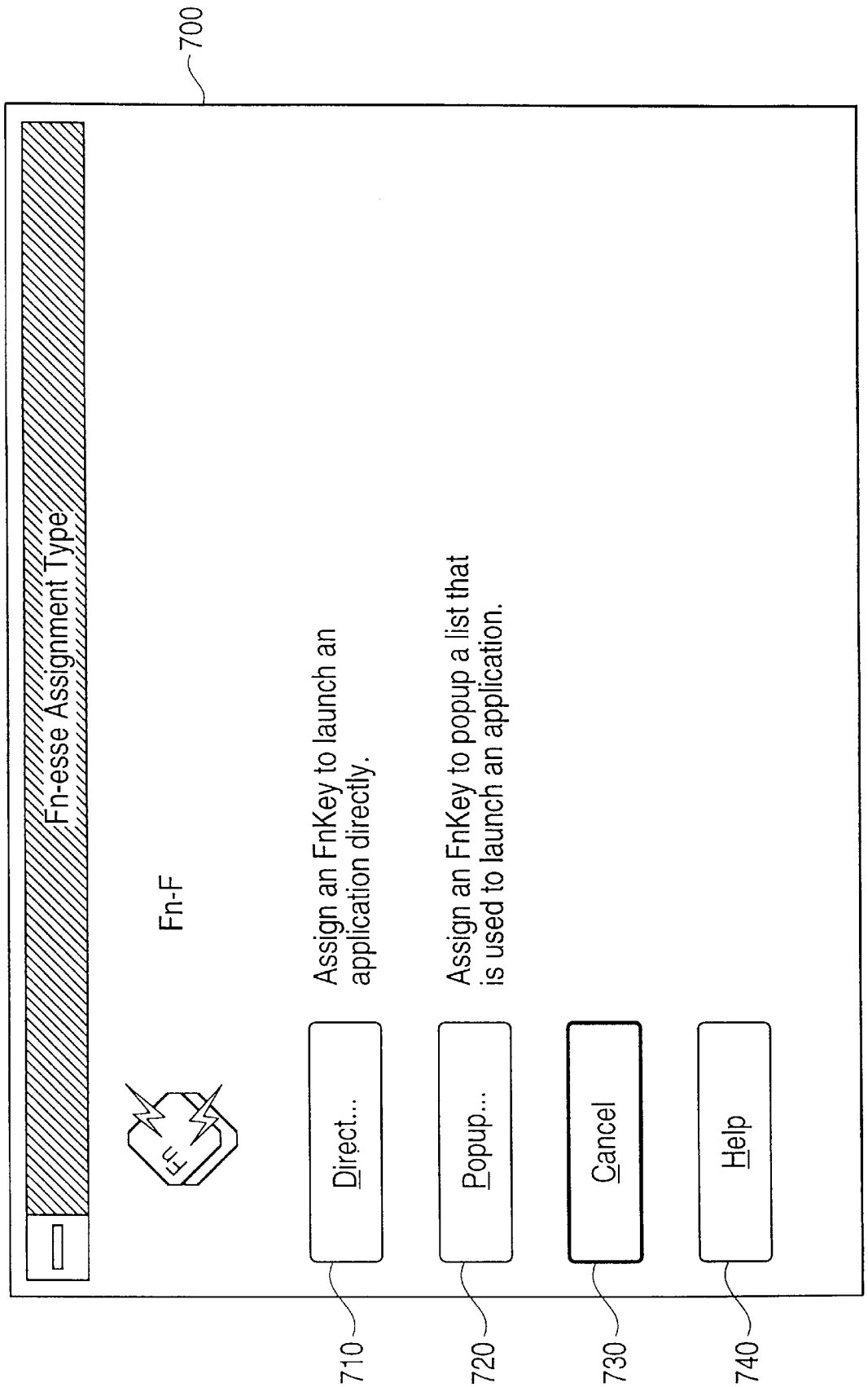

SYSTEM FOR RECONFIGURING A KEYBOARD CONFIGURATION IN RESPONSE TO AN EVENT STATUS INFORMATION RELATED TO A COMPUTER'S LOCATION DETERMINED BY USING TRIANGULATION TECHNIQUE

This application is a Continuation of application Ser. No. 08/518,495, filed Aug. 23, 1995, now abandoned.

FIELD OF THE INVENTION

The present invention generally relates to a system and method for dynamically reconfiguring a key or combinations of keys according to an event, and more particularly, to a system and method for automatically reconfiguring the key or key combination assignments so that the same key or combination of keys can launch an application or invoke an action associated with multiple events.

BACKGROUND OF THE INVENTION

Conventional computers have dedicated function keys or combinations of keys for invoking actions without requiring the entry of one or more lengthy commands. For example, a particular function key may change hardware settings or launch an application, but not both. Thus, the user can invoke an action by a so-called "shortcut" method. The Windows™ Program Manager (PM) from Microsoft Corporation of Redmond, Wash., provides a shortcut key facility that allows the user to specify a unique key combination that, when pressed, launches an application of the user's choice. These function keys are intended to allow users to more efficiently operate their computers.

The PM shortcut key facility suffers from the drawback that it is only operative when the PM is the active application. Accordingly, if another application is active, the user may be confused when the shortcut key combination will not work or, worse yet, may accidently invoke a different action that destroys important information.

Thus, a shortcut key facility was created that is operative regardless of the application active at the time. In U.S. patent application Ser. No. 08/262,517, filed Jun. 20, 1994, now abandoned, by the inventor of the instant invention, and entitled "System and Method For Launching Applications Using Dynamically Assignable Keyboard Bindings" and herein incorporated by reference, the user can define which application is launched when a particular key combination is pressed. The user can thus select applications that are used most frequently and associate such applications with function keys of his or her own choice. Thus, U.S. patent application Ser. No. 08/262,517 describes a procedure wherein a user can manually change the assignment of a key combination to invoke a different action. However, according to this procedure, the user is limited to a single configuration of keys or key combinations for assigning application launching capability thereto.

This approach limits mobile users who may use a different set of application/utilities specific to the demands of their work when situated in different locales. For example, a certain key combination may be used to invoke a user EMAIL application. However, when the user uses a portable computer, the key combination for the EMAIL application may vary depending on whether the user is locally connected to a network, e.g., in an office, or remotely connected via modem, e.g., on the road. When a user is in the office and directly attached to a network, the EMAIL program may run directly from the network. Alternatively, when the user is traveling, a different EMAIL program to batch process the mail may be required. To launch the EMAIL application, the user would have to assign two different key combinations. That is, one key combination for the local EMAIL application and one key combination for the remote EMAIL application, would be necessary.

This system requires a user to think and consciously remember which actions are invoked when the various functions keys are pressed depending on an event status. The problem is compounded by the fact that different actions may be invoked by the same function key or key combination when different applications are active. The user may thus conclude that using the function keys leads to unpredictable results. Further, the multiple key combinations required reduces the number of assignable key combinations for other functions and applications.

The user could assign the EMAIL application to the same key combination. However, each time the user changes between local and remote locations, the assignment to the desired key combination would have to be manually changed. Consequently, there remains a need to provide a system for easily reassigning key combinations for similar applications to the same key combination.

SUMMARY OF THE INVENTION

The present invention solves the aforementioned problems by providing a simple and efficient system and method for dynamically reconfiguring key combinations to an appropriate key binding without user intervention. Consequently, the user can utilize the same key combination for launching the appropriate application, thereby making it easier to remember the application associated with the key combination, and without having to manually change the assignment each time an event occurs such as a change in environment (e.g., office, road, home).

According to the present invention, an interface is provided which allows the user to assign a single key or key combination to launch a particular application type based on the current selected configuration. Thus, the user can define the application by a key combination and define new configurations based on the occurrence of an external event.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 6B provides an example of a KEY ASSIGNMENT CONFIRMATION dialog in accordance with the present invention.

FIG. 7 is a representation of a screen displayed when an ASSIGNMENT TYPE dialog is selected according to the present invention.

DETAILED DESCRIPTION OF THE PREFERRED EMBODIMENTS

For the sake of convenience, the present invention will be described primarily in the context of the Windows™ operating system. However, it should be understood that the present invention may be used in conjunction with other operating systems as well. In addition, while the present invention will be described in terms of reconfiguring key combinations based on a docking/undocking event, it should be understood that other events, such as the insertion/removal of a disk, a location notification event (e.g., via a global positioning system) based on the user's location, a time event (e.g., a preset time of day), a system error/maintenance event, to name a few, and other system events, may be associated with reconfiguring particular key combinations in keeping with the present invention. The term key binding is used herein to refer to the association between a particular key or key combination and one or more applications or other actions.

Figure 1A:
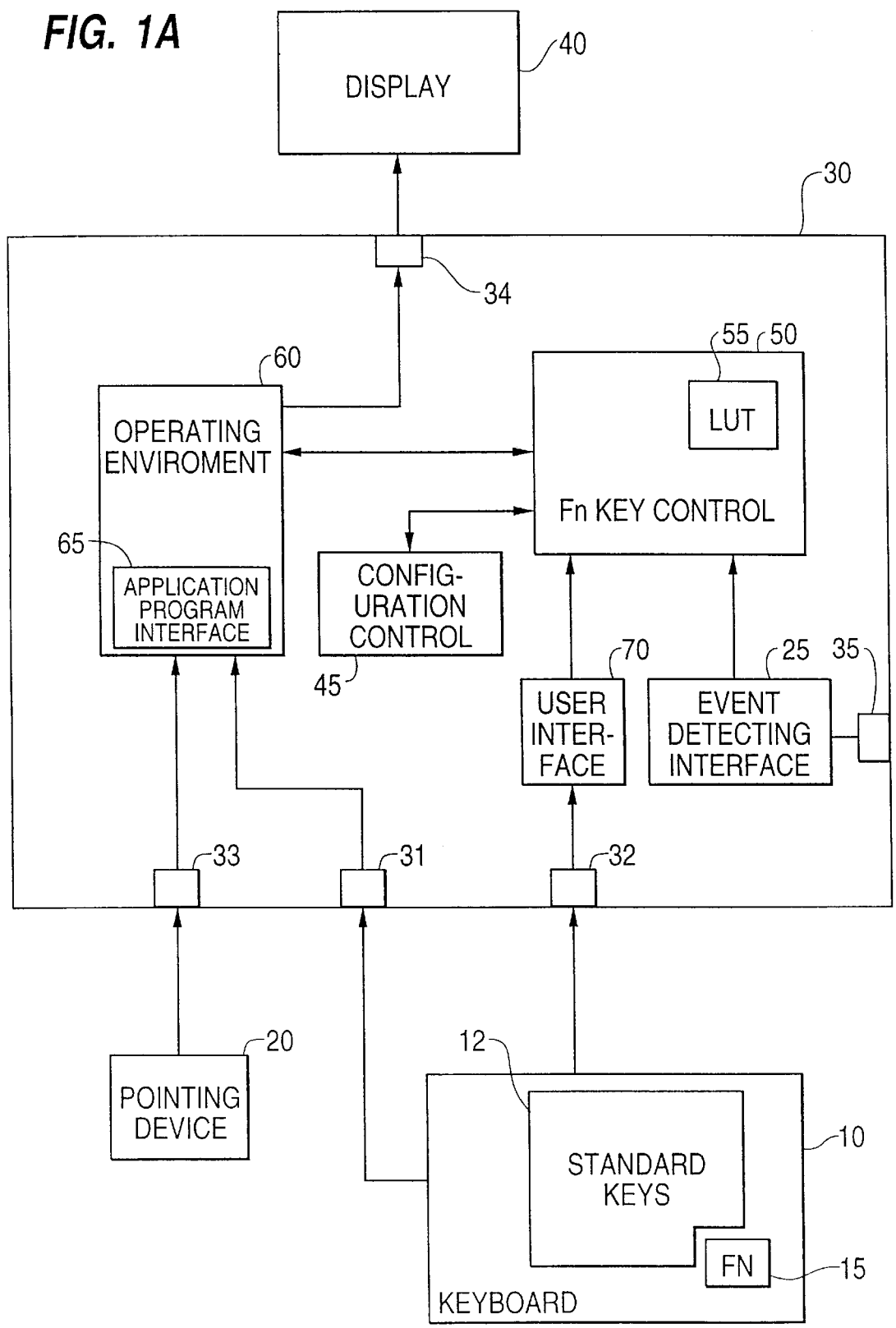
FIG. 1A is a functional block diagram illustrating a computer system in accordance with the present invention.

FIG. 1A is a functional block diagram illustrating a computer system having a keyboard 10, a pointing device 20, a computer 30, and a display 40. The computer system may comprise physically separate components or an integral device, such as a notebook computer.

The keyboard 10 includes standard keys 12 and an additional non-standard key 15 referred to herein as the Function Key (FnKey). of course, standard keys 12 of the keyboard 10 may include keys corresponding to any alphabet desired, numerical keys, function keys, etc. The FnKey 15 can be used in conjunction with other keys to actuate several specific features such as launching various applications, documents, and non-default configuration files. Accordingly, a different application can be associated with each combination of the FnKey 15 and a standard key 12. The term FnKey combination will refer herein to the FnKey 15 pressed in combination with a standard key 12 (2 keys pressed simultaneously).

The standard keys 12 may each have an additional silk-screened legend to indicate the associated application when used as an FnKey combination. Each of the standard keys may be assigned to a one or more particular applications or a group of applications for all configurations. A group of applications may be assigned to an FnKey combination where, for example, a pop-up list appears including a list of applications (a group) from which the user selects the application(s) to be launched. The applications launched or other actions executed when an FnKey combination is pressed are based on the active keyboard configuration which is dynamically assigned in accordance with the current event status.

Because the FnKey is non-standard hardware, the operating environment used by computer 30, for example, Windows™, does not receive the keycodes generated when the non-standard FnKey 15 is pressed or the FnKey combinations are pressed. As a result, an FnKey or FnKey combination keystroke is transparent to standard applications (i.e., applications not specifically equipped to utilize the non-standard FnKey) and to the operating system. Accordingly, the particular FnKey or FnKey combination may invoke the same action regardless of the application that is active at the time.

When a standard key 12 of keyboard 10 is pressed, a signal representing the pressed key is sent to a computer 30 via a first input port 31. The keystroke is then processed using an operating environment 60 conventional in the art, including, for example, software of the operating system and the active application. According to the active application, information generated by the operating environment 60 may be output to a display 40 via an output port 34. Alternatively, pointing device 20, such as a mouse or a tracking ball, for example, may be used to input information to operating environment 60 via a pointing device input port 33. In this context, the operation of the computer system proceeds as is conventional in the art.

When the FnKey 15 is depressed either alone or in combination with one or more standard keys 12, keyboard 10 sends the resulting keystrokes to the computer 30 via a second input port 32.

An event detecting interface 25 detects the current event status. According to one embodiment of the present invention, docking port 35 is coupled to event detecting interface 25. Docking port 35 connects the computer 30 to a docking station. Docking port 35 includes hardware needed to connect (dock) computer 30 to a docking station. Docking port 35 is adaptable to dock computer 30 to docking stations including networks and peripherals such as a hard drive, CD ROM, sound card, etc.

In this embodiment, event detecting interface 25 determines the event status (e.g., docked/undocked) of the computer and forwards that information to FnKey control 50. When docked, the user may be employing the computer in an office or home working environment, and when undocked the user may be utilizing the computer in a road working environment. According other embodiments of the invention, event detecting interface 25 may be connected to operating environment 60, user interface 70, etc., and other portions of computer 30 depending on the type of event or events to be detected.

FnKey control 50 forwards the event status information to configuration control 45. configuration control 45 automatically changes the keyboard configuration to the predefined configuration which corresponds to the current event (e.g., docking state).

A user interface 70 captures signals corresponding to the pressed FnKey combination and includes a keyboard input/output interface (not shown). For example, user interface 70 may contain polling codes for detecting incoming signals on input port 32. The detected signals are passed to an FnKey control 50 where they are used as an input to a look-up table 55. The look-up table 55 determines information relating to the application associated with the pressed FnKey combination. This information is passed to an application program interface 65 of the operating environment 60. In general, the application program interface 65 is used by the particular operating system of computer 30 to launch the application.

Figure 1B:
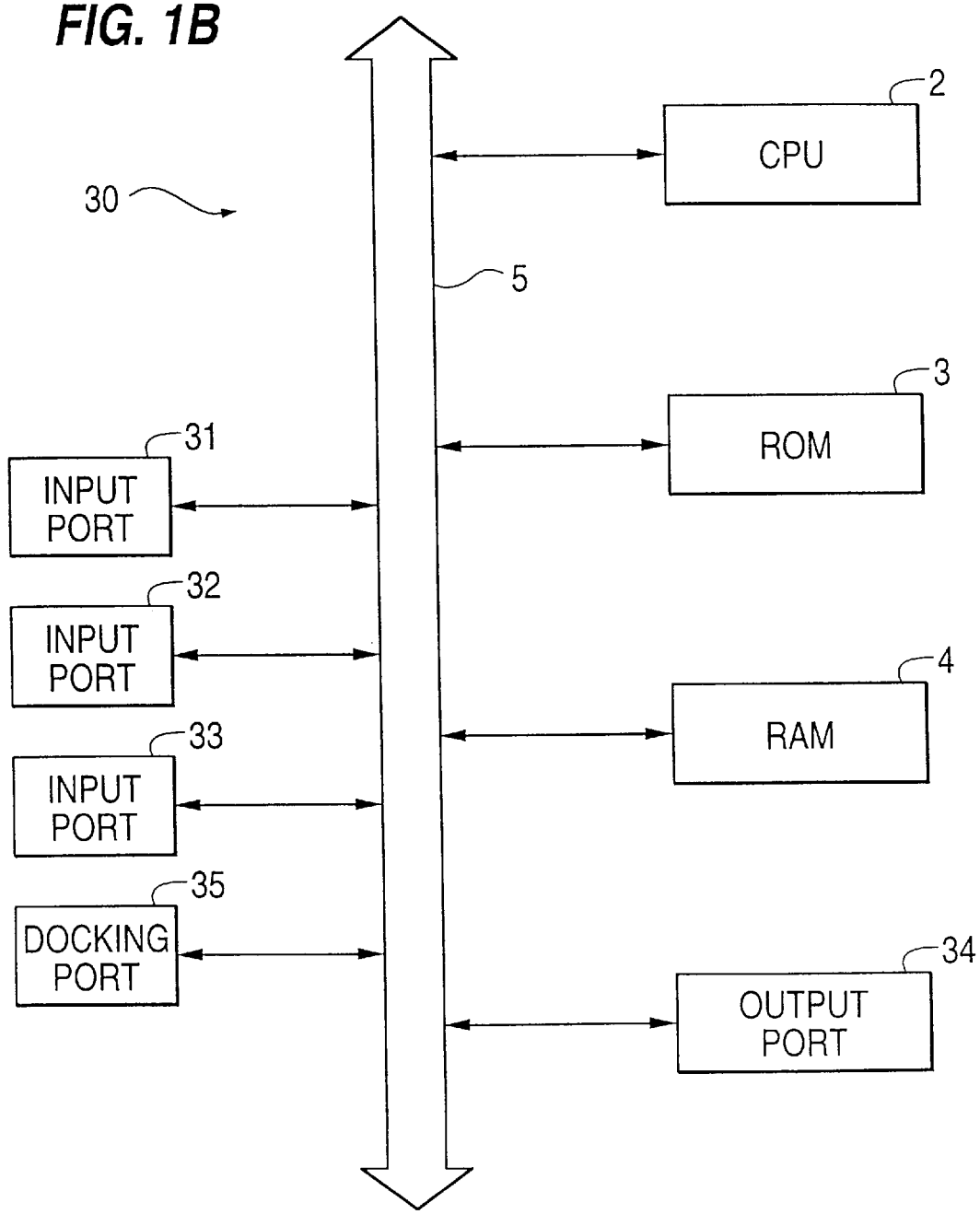
FIG. 1B is a high-level diagram illustrating the general hardware components of computer 30 of FIG. 1A.

FIG. 1B illustrates a high-level diagram of computer 30 of FIG. 1A. Computer 30 comprises a central processing unit (CPU) 2, a read-only memory (ROM) 3, a random access memory (RAM) 4, and a bus 5. Bus 5 connects the CPU 2, ROM 3, RAM 4, with input ports 31–'33, output port 34, and docking port 35. CPU 2 carries out processing operations using instruction information stored in ROM 3 and programming information and working memory stored in RAM 4. Input from keyboard 10 are received via input ports 31 and 32, and input from pointing device 20 is received via input port 33. Display information is output to display 40 via output port 34. Docking port 35 connects a docking station with computer 30. Event detecting interface 25, FnKey control 50, operating environment 60, and user interface 70 are generally implemented using CPU 2, ROM 3, and RAM 4.

Figure 1C:
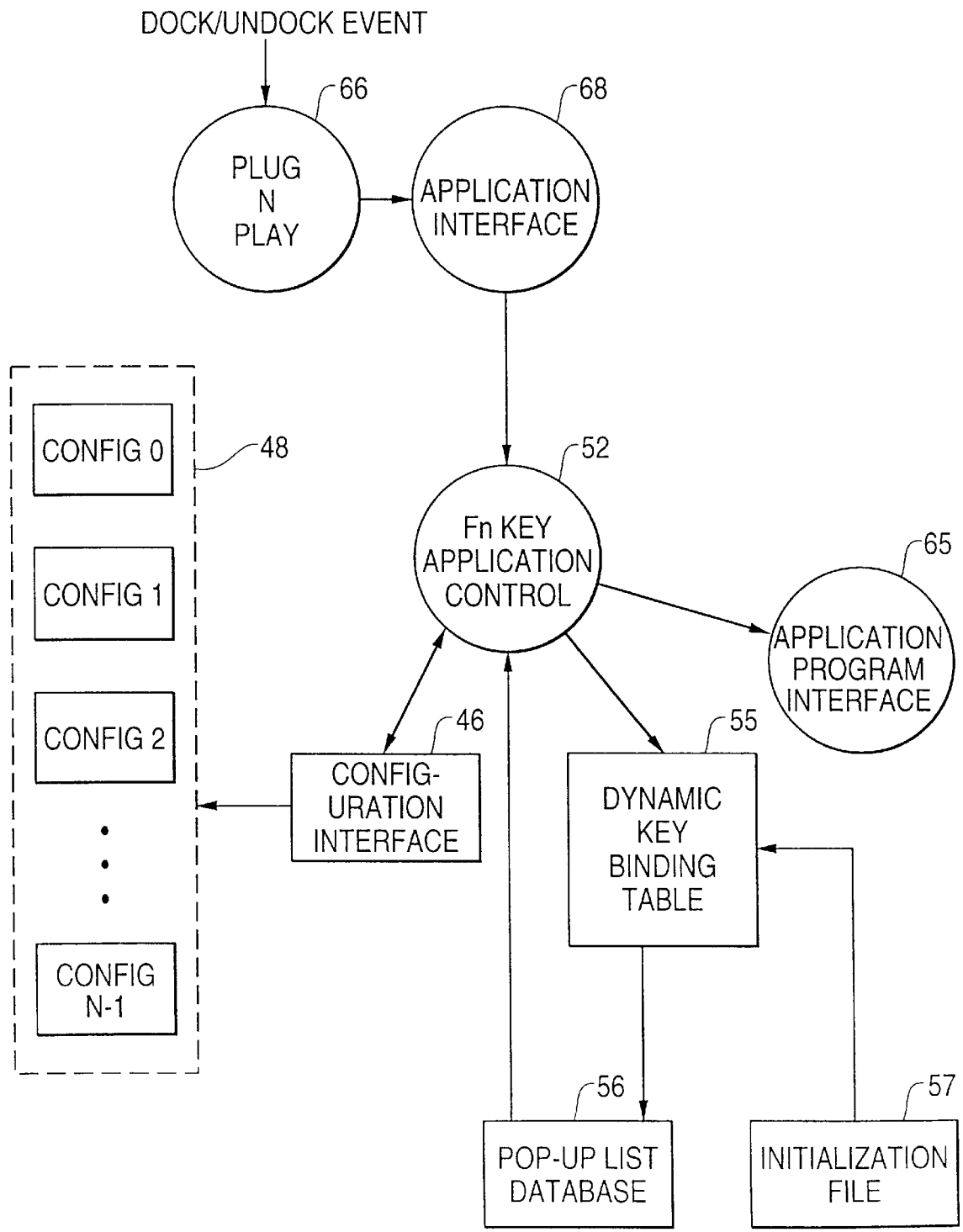
FIG. 1C is a functional block diagram illustrating operations within computer 30 of FIGS. 1A and 1B in greater detail.

FIG. 1C is a functional diagram illustrating the operation of computer 30 in greater detail. As seen in FIG. 1C, plug and play portion 66 of the basic input/output system (BIOS) interface and application interface 68 generally form part of the event detecting interface 25 according to an illustrative embodiment of the invention. It is to be understood that other types of interface based on the event to be detected would be used rather than the plug and play portion 66. Application program interface 65 forms part of the operating environment 60. FnKey application control 52, look-up table 55 (also referred to as dynamic key binding table), and pop-up list data base 56 generally form part of the FnKey control 50. Initialization file 57 may be used to store look-up table 55 and other information such as configuration/group color information for display features, configuration/group naming information, and screen placement information.

Configuration interface 46 and configuration memory 48 form part of configuration control 45. Configuration memory 48 stores the keyboard configuration definitions for the various event states (e.g., docking states, user locations, time of day, etc.) of the computer 30. Also, configuration memory 48 stores user interface color information, and other interface options configuration. This information is maintained in a .NNN file, where NNN is the number associated with the configuration file. Configuration memory 48 is typically part of hard memory which is not affected by, for example, turning off the computer.

In the docking event embodiment according to the present invention, plug and play portion 66 of the BIOS interface detects when the docking state of computer 30 changes and application interface 68 monitors the docking state and provides docking/undocking event support. Generally, application interface 68 monitors the prescribed events upon which a configuration change may be required. When an event requiring a reconfiguration of the keyboard assignment occurs, the FnKey application control 52 receives control signals from application interface 68 indicating the same.

Configuration interface 46 receives the control signals from FnKey application control 52 and converts those signals into an address representing the location of the keyboard configuration information corresponding to the detected event. Configuration interface 48 uses the address to retrieve the predefined keyboard assignment configuration information from configuration memory 48. Next, configuration interface 46 passes the retrieved information to FnKey application control 52. FnKey application control 52 directs the information to dynamic key binding table (look-up table) 55 to change the active keyboard configuration to another keyboard configuration defined by the keyboard assignment configuration information associated with the current event. Thus, the active keyboard configuration is stored in dynamic key binding table 55.

In accordance with the above, the keyboard assignment configuration can be quickly reconfigured for different locations, projects, and uses. For example, the user may use a different communications application when docked than while undocked or "on the road". In general, the different applications are mutually exclusive so rather than assigning two different keys for each application, the user may assign a single key, e.g., Fn-C, for the communications program. The selected configuration manages the appropriate application to be launched.

The dynamic key binding table 55 is a look-up table, configured by the keyboard configuration assignment information obtained from the configuration memory 48 via the configuration interface 46 and FnKey application control 52, that associates FnKey combinations with applications, including information concerning the applications, such as its directory and other information necessary or useful for launching the application. The keyboard configuration assignment information provides the selected keyboard configuration to the dynamic key binding table 55 to overwrite the previously defined configuration. The existing dynamic key binding table 55 in the form of keyboard layout information may be stored in an initialization (.INI) file 57. However, the dynamic key binding table 55 may be stored as, or part of, another file or in RAM to allow quick access. The FnKey application control 52, responsive to an FnKey combination pressed by the user, references the dynamic key binding table 55 to launch the appropriate application.

An application interface (not shown) detects that an FnKey combination has been pressed, it sends a message to the registered applications indicating the FnKey combination pressed and released. Communications between this application interface and the registered application are effected using the operating system's messaging system (not shown). For example, this application interface may communicate with the registered applications using the standard Windows™ messaging system when in a Windows™ environment. One of the applications that is registered with this application interface is FnKey application control 52, which controls and executes operations for assigning applications to FnKey combinations and for launching such applications. Accordingly, the FnKey application control 52 receives an indication dispatched from the messaging system that a particular FnKey has been pressed. In practice, the operating system software of the computer 30 runs simultaneously with the software forming FnKey control 50 and user interface 70. However, FnKey application control 52 is run in the background of the operating system and uses very little CPU time since user interface 70 is the mechanism that actually polls the keyboard input/output interface.

According to an illustrative embodiment of the present invention, each FnKey combination can have one of three states. Certain FnKey combinations may be disabled and not assignable to an application by the user. Disabled FnKey combinations are processed entirely by the BIOS interface, and do not result in any signal to the input ports of the computer. Thus, the user interface never receives an indication that such disabled FnKey combinations were pressed. Accordingly, if a keycap is disabled, it cannot be bound to form an FnKey combination since the BIOS interface traps the key before the key can be scanned by the user interface. For example, FnKey combinations that are disabled may be fixed to a pre-assigned application or function. Alternatively, a manufacturer may disable certain FnKey combinations to limit the number of applications that can be launched using FnKey combinations.

The FnKey combinations that are not disabled may be assignable to an application or pop-up list. The assignable FnKey combinations may be bound to an application or a pop-up list, or unbound and available for assignment. The bound FnKey combinations have an associated application or a pop-up list stored in the dynamic key binding table 55. An unbound FnKey combination may be assigned, but currently does not have an associated application or pop-up list stored in the dynamic key binding table 55. The status of each FnKey combination can be stored in the dynamic key binding table 55.

If the FnKey combination is bound to an application, information concerning the application is transferred back to the FnKey application control 52. Alternatively, the information corresponding to the FnKey combination may refer to pop-up list database 56. The pop-up list database 56 may be built from, for example, the Windows™ Program Manager group database to allow a replacement shell to coexist with the FnKey application control 52. Accordingly, a pop-up list capable of displaying a plurality of applications is displayed to the user on the display 40. This may be accomplished via the FnKey application control 52 and the application program interface 65. The user may then select an application from the pop-list using the standard keys 12 or pointing device 20. Information concerning the selected application is transferred to the FnKey application control 52. Consequently, the FnKey application control 52 passes the information for the application to be launched to the application program interface 65, standard for operating environments, for launching. One application program interface suitable for use in accordance with the present invention is WinExec™. The present invention consistently responds to the FnKey combination by launching an application or series of applications specified by the assigned configuration or providing a pop-up list defined by the assigned configuration to provide the user with several applications and application series from which to select.

User interaction with FnKey application control 52 will now be discussed in detail. The user can interact with FnKey application control 52 to launch an application or to define a keyboard configuration which assigns various applications to FnKey combinations. In addition, the user can control various settings for specific features of the present invention. Generally, the user interacts with FnKey application control 52 using pointing device 20 and/or keyboard 10. User interaction is facilitated by several screen images displayed on display 40. In accordance with one embodiment of the present invention, FnKey application control 52 can be fully operated without pointing device 20. Accordingly, reliance upon pointing device 20 can be reduced. FnKey application control 52 may also be fully operated using pointing device 20, as will be discussed more fully below.

The screens supported by the present invention will now be described in connection with FIGS. 2–13. While FIGS. 2–13 are shown in a Windows™-type format, it should be understood that other formats may be used as well. A main screen 200 can be invoked by pressing a pre-defined FnKey combination, such as FnTAB (i.e., pressing the FnKey 15 and TAB in combination). Thus, FnTAB guarantees access to the FnKey application control. When the FnTAB combination is pressed, the FnKey application toggles between the active state of the FnKey application and the minimized or hidden version. Once FnTab is used, the input focus is changed to allow the keyboard interface to capture and interpret keystrokes. Of course, another key may serve as the fixed binding for accessing the FnKey application control. Alternatively, the FnKey application control can be run in the same way as a conventional application to produce the main screen 200.

Figure 2:
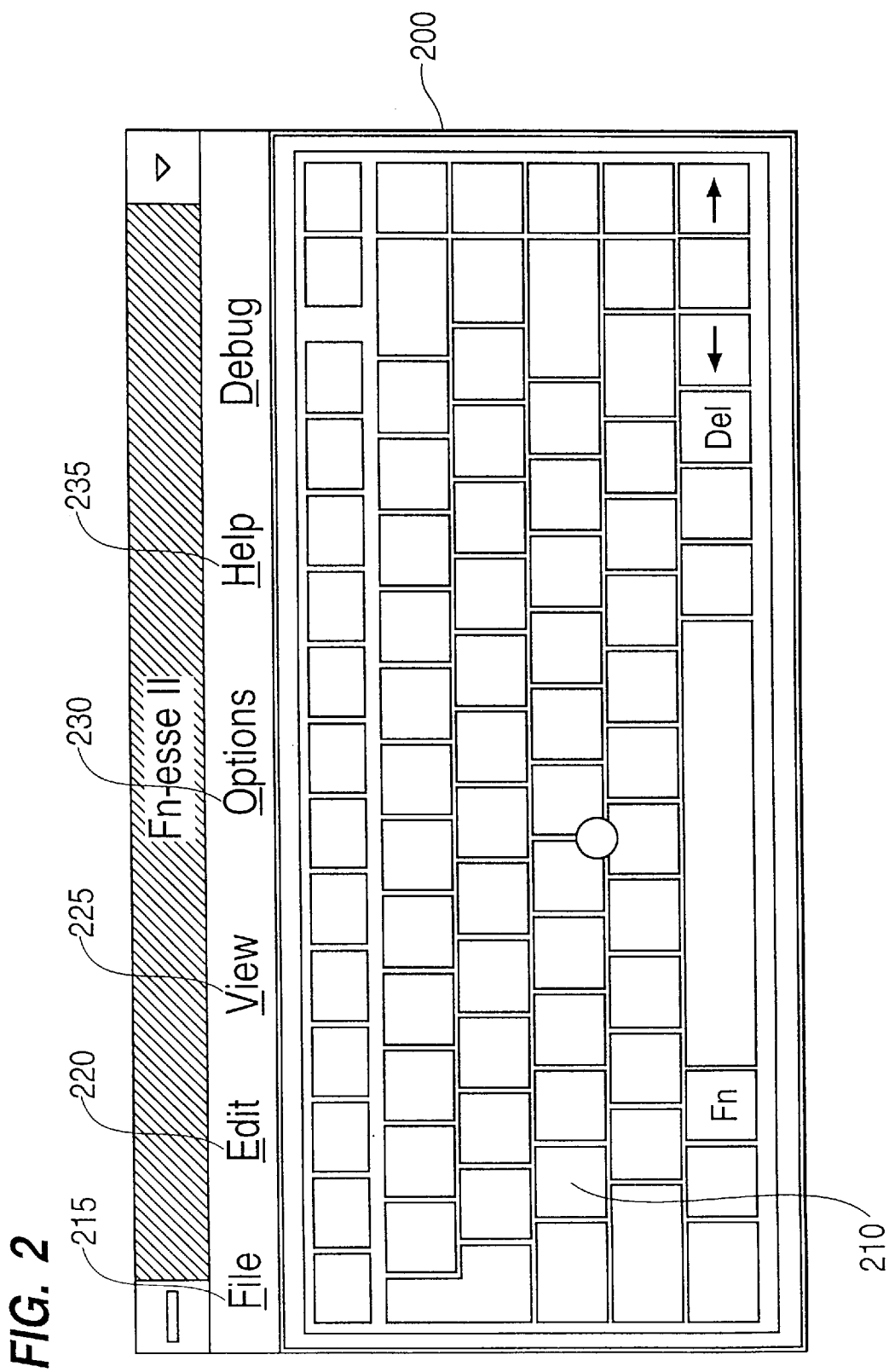
FIG. 2 is a representation of a virtual keyboard screen that may be used in connection with the present invention.

As depicted in FIG. 2, the main screen 200 provides the user with a visual representation of a keyboard indicating the assigned, unassigned and disabled keys in addition to other functions for management of the application. In particular, FIG. 2 illustrates a screen 200 having keycaps 210 and menu items File 215, Edit 220, View 225, Options 230, and Help 235. Of course, the various features of the present invention may be selected using other means, for example, button images provided in the screen image.

The main screen 200 provides the user a visual representation of the assigned (bound), unassigned (not bound), and disabled keys. Keycaps 210 can be used to indicate the status of a particular key when used as an FnKey combination. For example, disabled keys may be annotated by a first color, as provided by default or as selected by the user. The first color may, for example, be dark gray. If the keycap is currently bound to an application or a pop-up list, it can be displayed using a second color. The second color may be, for example, a highlighted color. If a keycap is not currently bound, it is available for assignment and may be annotated by a third color, different than the first and second colors, for example, black. The default color for currently unassigned keys may be black. It should be understood that color indication described above is intended to be exemplary, and that the different states of the keycaps may indicated by shading or otherwise in accordance with the invention.

Several additional functions are supported by the main screen 200. For example, the main screen 200 can be used to launch applications for currently assigned keys, edit the assignment of a currently assigned key, or assign an application or pop-up list to a currently unassigned key. An application can be launched in at least two ways. First, the user can click the primary button of the pointing device while a cursor is positioned over a currently assigned key. Second, the user may press the corresponding key in combination with the FnKey on keyboard 10. In either case, the application assigned to the currently assigned key will be launched. If the currently assigned key is associated with a pop-up list, the pop-up list will be presented to the user.

When an FnKey is bound, a user may edit the key binding by placing the pointer over the keycap and pressing the primary button. When this occurs, FnKey application control presents the user with a pop-up list to choose what type of editing action should take place. The pop-up list provides the following options: 1) new assignment type; 2) edit current assignment type; 3) clear current assignment type; and 4) move the current assignment from one key to another. Selection of one of these options causes a user dialog to be displayed from which the user can edit current parameters. The user dialog may be the ADD/EDIT COMMAND dialog discussed below in connection with FIG. 8, or an ASSIGNMENT TYPE dialog discussed below in connection with FIG. 7. If there is no current assignment, by either pressing the corresponding FnKey combination on keyboard 10 or clicking the primary button of the pointing device, the ASSIGNMENT TYPE dialog, discussed below in connection with FIG. 7, is invoked to enable the user to assign an application or pop-up list to a currently unassigned key.

Use of the FnKey application control 52 with the pointing device 20 enables an additional method for editing/assigning an application to an FnKey combination. The drag-n-drop feature of the Windows™ operating system supported by the Windows™ File Manager or other application can be used to select a file by a representative icon and drag the selection onto a specific keycap of the virtual keyboard of the main screen 200. When an assignable keycap is selected, a dialog box may be presented to the user to view the selection and/or confirm the new assignment.

When "File" menu item 215 is opened, the user is presented with a list of actions that modify/activate the FnKey configuration. The actions available from the list may include "New Configuration", "Open (Switch to Configuration)", "Rename Configuration", and "Remove Configuration".

Figure 3A:
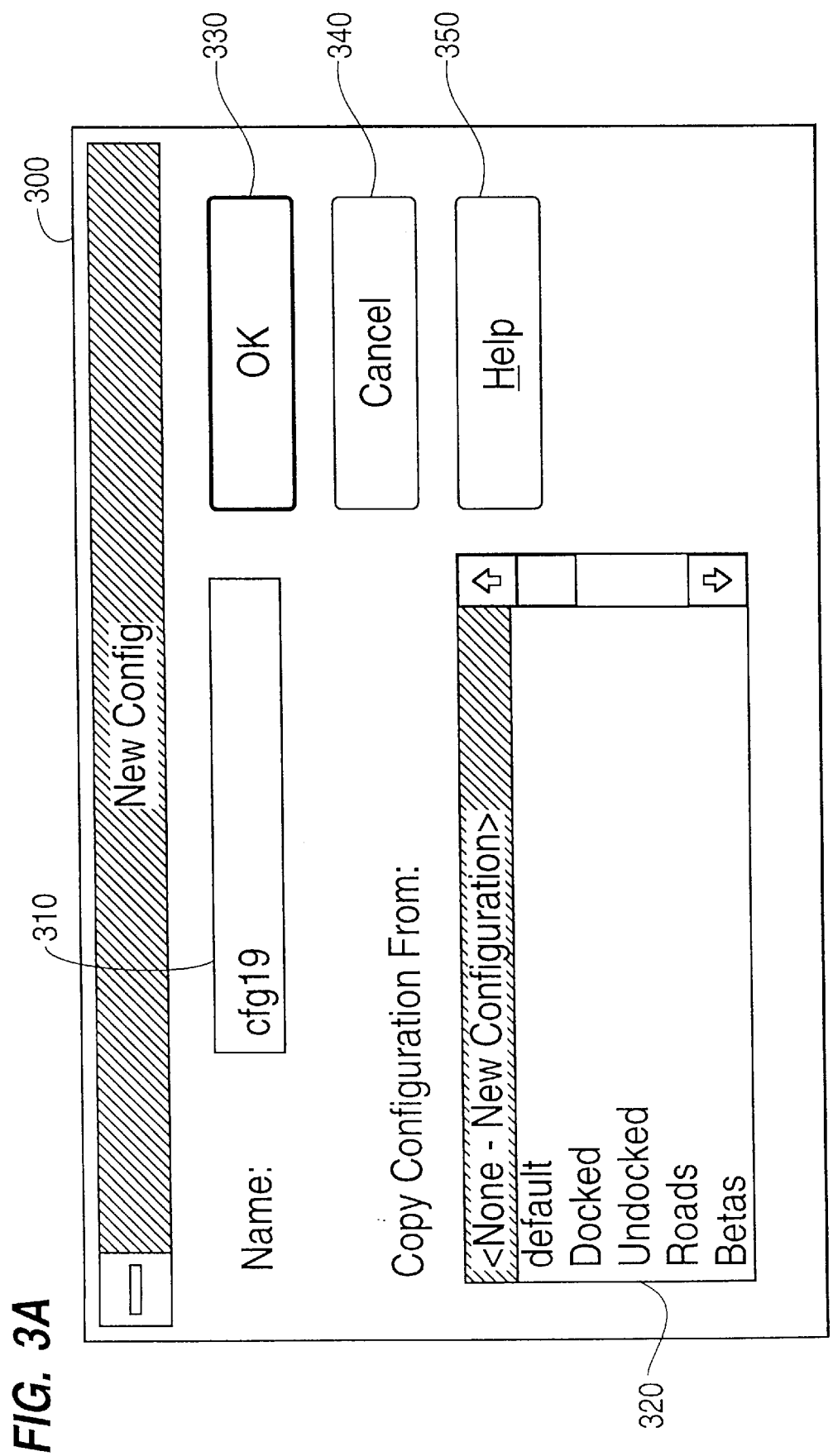
FIG. 3A is a representation of a screen displayed when a NEW CONFIG dialog is selected according to the present invention.
Figure 3B:
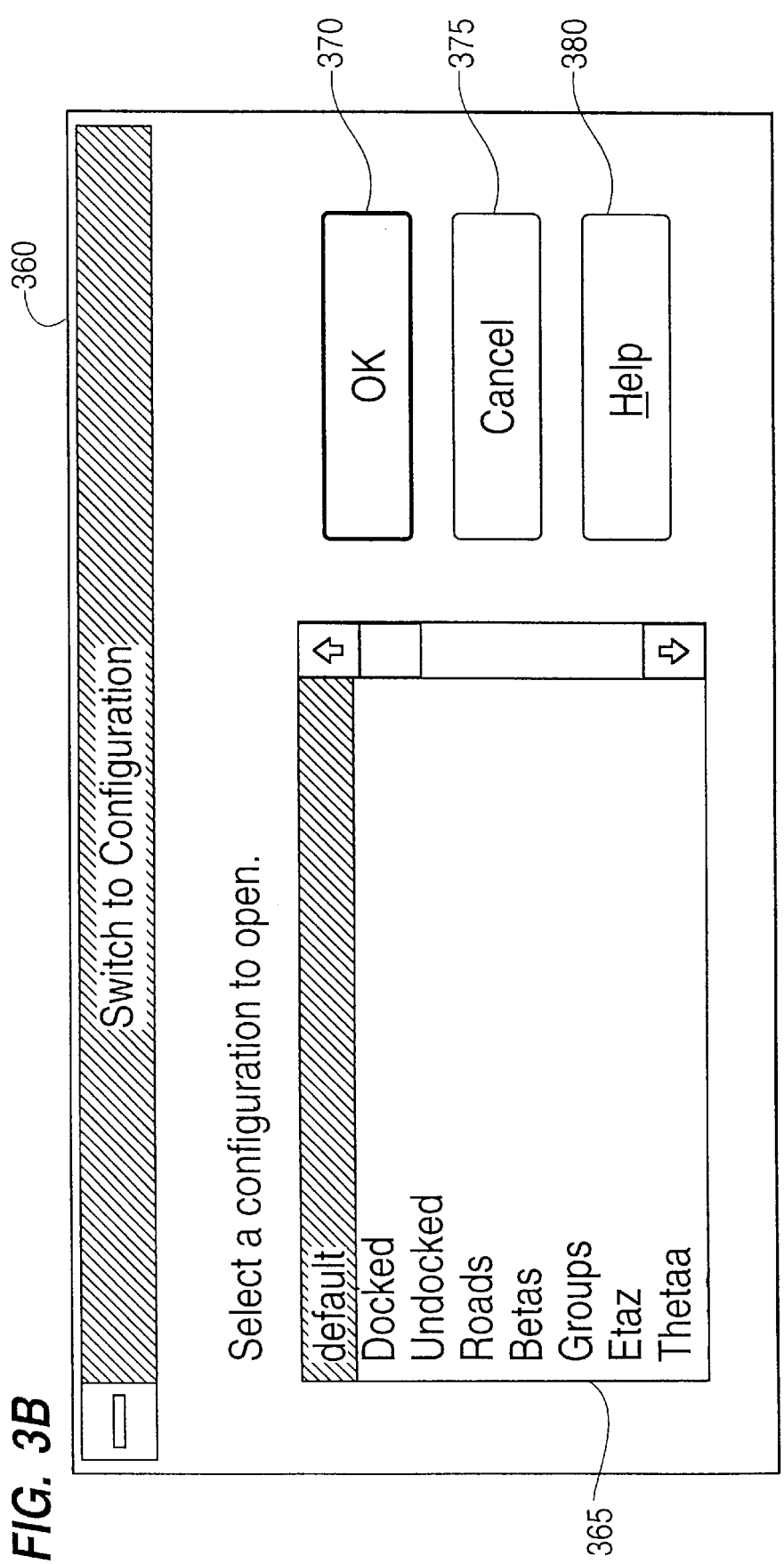
FIG. 3B is a representation of a screen displayed when a SWITCH TO CONFIGURATION dialog is selected according to the present invention.

The "New Configuration" menu item may be used to create a new configuration (CFG) that can be selected. After selecting this menu item, a NEW CONFIG dialog allows the user to create the new CFG based on a previously defined CFG to reduce the amount of work necessary to setup the key bindings. The NEW CONFIG dialog is shown in FIG. 3A. In the NEW CONFIG dialog box 300, the "Name" edit line 310 provides edit control and is used to edit the default name of the group. By default, the new assignment name is blank and the "OK" button 330 is disabled until the user places a valid name in the edit line 310. "CFG" listbox 320 displays the currently defined CFGs. The user may use the pointing device 20 to select and accept the configuration defined in the dialog. By default, the new assignment creates a blank configuration with default settings. When the user actuates the "OK" button 330, the configuration parameters which have been selected are accepted and control returns to the previous context (e.g., the main screen). Actuation of the "Cancel" button 340 discards all changes that have been made to the dialog and returns control to the previous context. Actuating the "Help" button 350 provides context sensitive help.

The "Open (Switch to Configuration)" menu item can be used to select a previously defined CFG as the active configuration. When this menu item is selected, SWITCH TO CONFIGURATION dialog box 360 depicted in FIG. 3B appears. The "CFG" listbox 365, the "Cancel" button 375, and the "Help" button 380 function substantially the same as the same features described above with respect to the NEW CONFIG dialog shown in FIG. 3A. Actuating the "OK" button 370 causes the dialog parameters which have been selected to be accepted and causes control to return to the previous context (e.g., the main screen). However, the "OK" button 370 is disabled unless a configuration has been selected from the "CFG" listbox 365.

The "Rename Configuration" may be used to edit the properties of the active CFG, for example, changing the name and/or removing all active bindings in the currently selected CFG. If any valid bindings are active, a prompt ensures that the user is aware that the previous CFG is lost. The CFG is then removed from the local database and the current CFG is set to the first available CFG. If the user attempts to remove a CFG used for docking support then an error message is displayed.

When "Edit" menu item 220 from main screen 200 is opened, methods for invoking the user dialogs to edit the Configuration/Group information are listed in a pop-up menu including "Assignments" and "Custom Groups".

Figure 4:
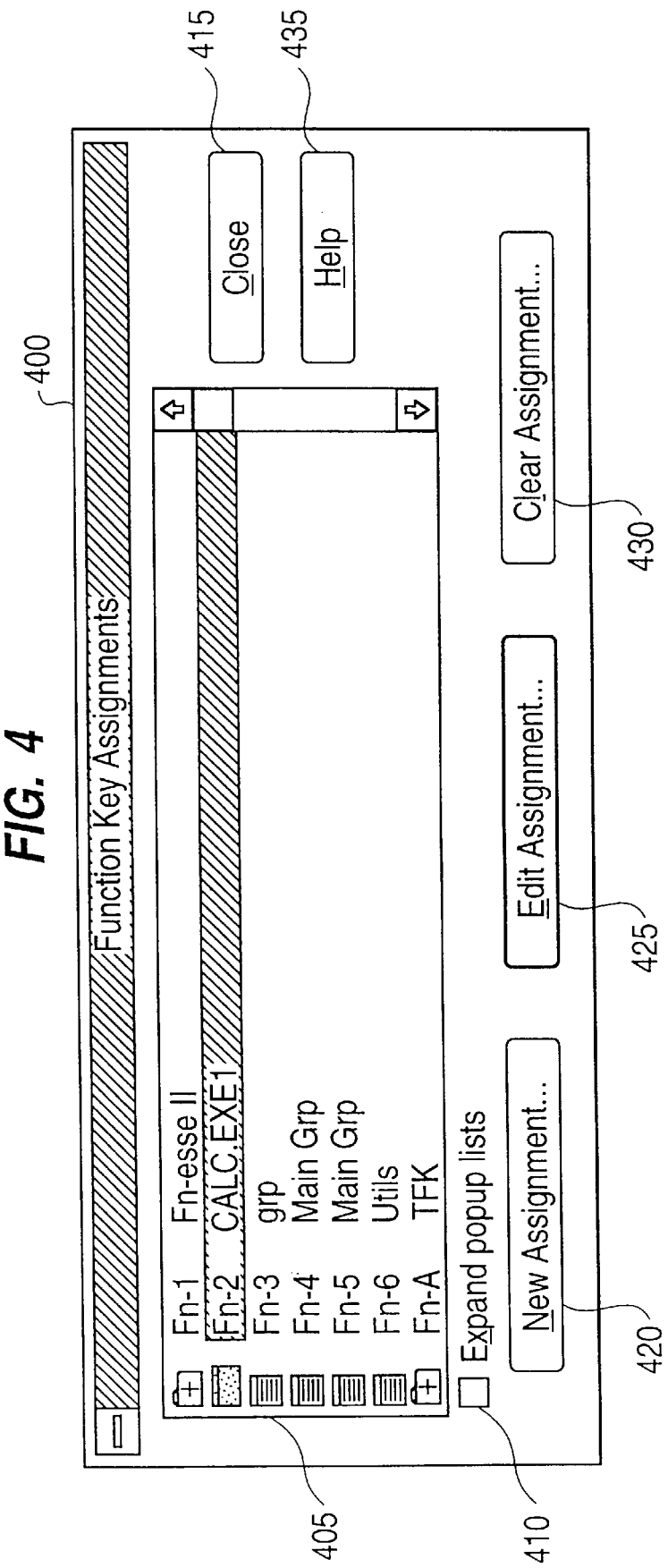
FIG. 4 is a representation of a screen that may be displayed when a FUNCTION KEY ASSIGNMENTS dialog is selected from the virtual keyboard screen illustrated in FIG. 2.

When the "Assignments" menu item from the pop-up menu is opened, the user is presented with a FUNCTION KEY ASSIGNMENTS dialog box 400 as depicted in FIG. 4. The FUNCTION KEY ASSIGNMENTS dialog allows the user to view all of the FnKey combination assignments and thereby presents the user with a unified means for viewing all assignments for updating, deleting, or editing. This dialog provides the user with a comprehensive sorted list of all the key assignments from the dynamic key binding table in the "Binding" listbox 405. If an FnKey is associated with a pop-up list, the dialog also displays all the list items in the group as long as the "Expand Popup List" checkbox 410 is checked. The default option may be unchecked, where the pop-up list items are not expanded. Additionally, FUNCTION KEY ASSIGNMENTS dialog enables editing of a key binding via the keyboard interface, which is particularly useful when no pointing device is available.

The "Close" button 415 is used to close the FUNCTION KEY ASSIGNMENTS dialog box 400. The "New Assignment" button 420 may be disabled initially. However, when a valid FnKey item is selected in the "Binding" listbox 405, this button is enabled to allow the user to create a new assignment for the selected Fnkey. The "Edit Assignment" button 425 may also be initially disabled. When a valid previously assigned FnKey item is selected in the "Binding" listbox 405, this button is enabled to allow the user to edit the selected key binding. Also, the "Clear Assignment" button 430 may be disabled initially. When a valid currently assigned FnKey item is selected in the "Binding" listbox 405, this button is enabled to allow the user to clear the current assignment. The "Help" button 435, when actuated, provides context sensitive help information.

When the "Custom Groups" menu item is selected from the pop-up menu for "Edit" menu item 220 from main screen 200, the user may be presented with the custom GROUP dialog discussed below with reference to FIG. 12 to select a group (GRP) for assignment to an FnKey. Once a GRP is selected, the properties of the GRP can be edited using the EDIT GROUP PROPERTIES dialog described below in connection with FIGS. 13A and 13B. The "Custom Groups" menu item can provide the user with a keyboard only interface to edit the GRP properties.

The "View" main menu item 225 provides the user with a list of user configurable options to control the views being displayed. The options include the "Toolbar" menu item, "Custom Group" menu item, the "Status Bar" menu item, the "All" menu item, and the "None" menu item.

Figure 5A:
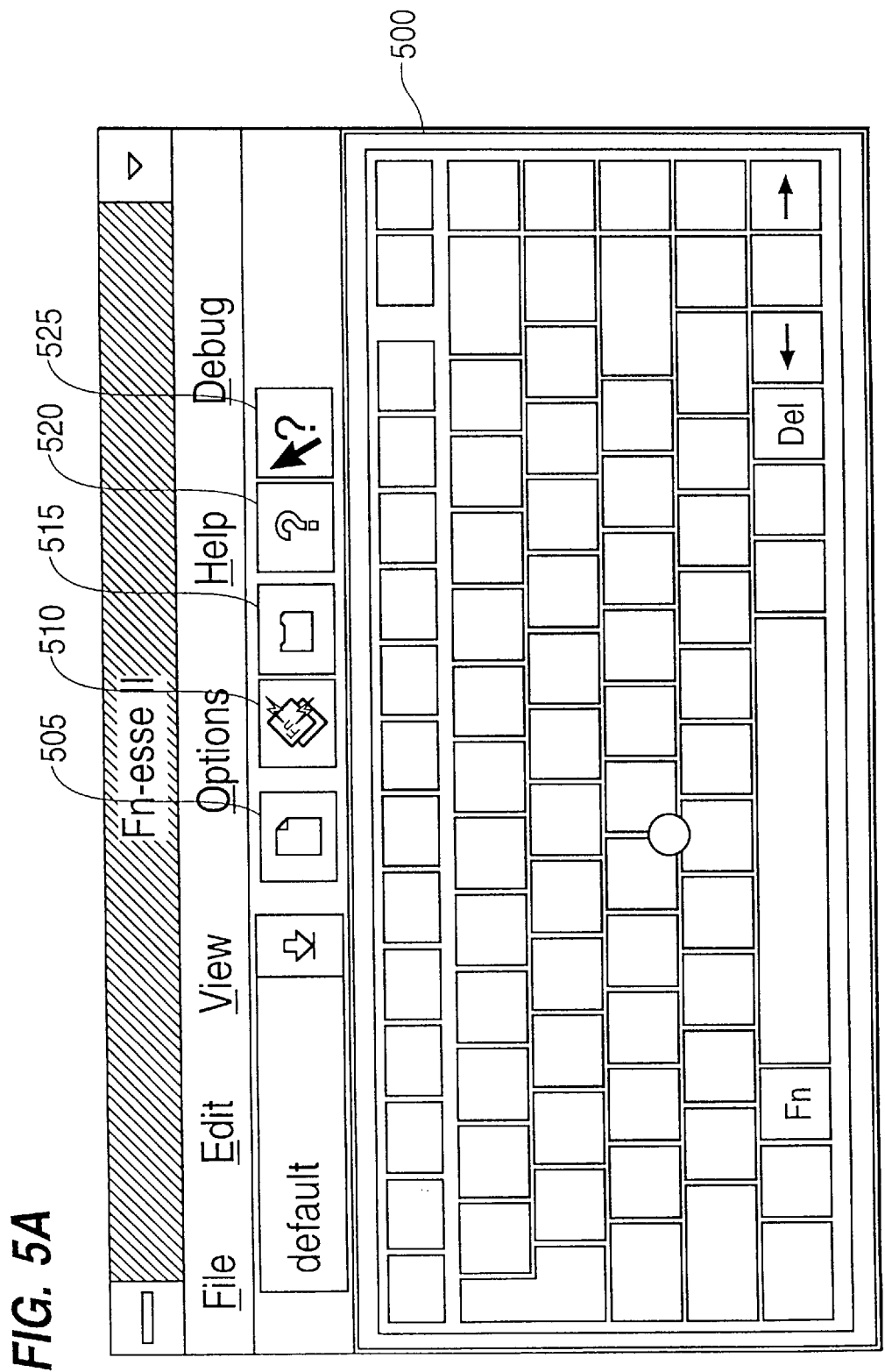
FIG. 5A is a representation of a toolbar view that may be selected in accordance with the present invention.

The "Toolbar" menu item enables/disables the toolbar to be displayed. The toolbar view shown in FIG. 5A is displayed when enabled by the "Toolbar" menu item. The toolbar is used to access menu item functions via the pointing device 20. In the embodiment shown in FIG. 5A, the toolbar view 500 includes five icons or toolbar buttons 505, 510, 515, 520, and 525 that relate to functions accessible from the main menu items. For example, toolbar buttons can provide the following functions, among others, "New Configuration" and "Open Configuration" from the "File" menu item 215, and "Assignments" and "Custom Groups" from the "Edit" menu item 220.

Figure 5B:
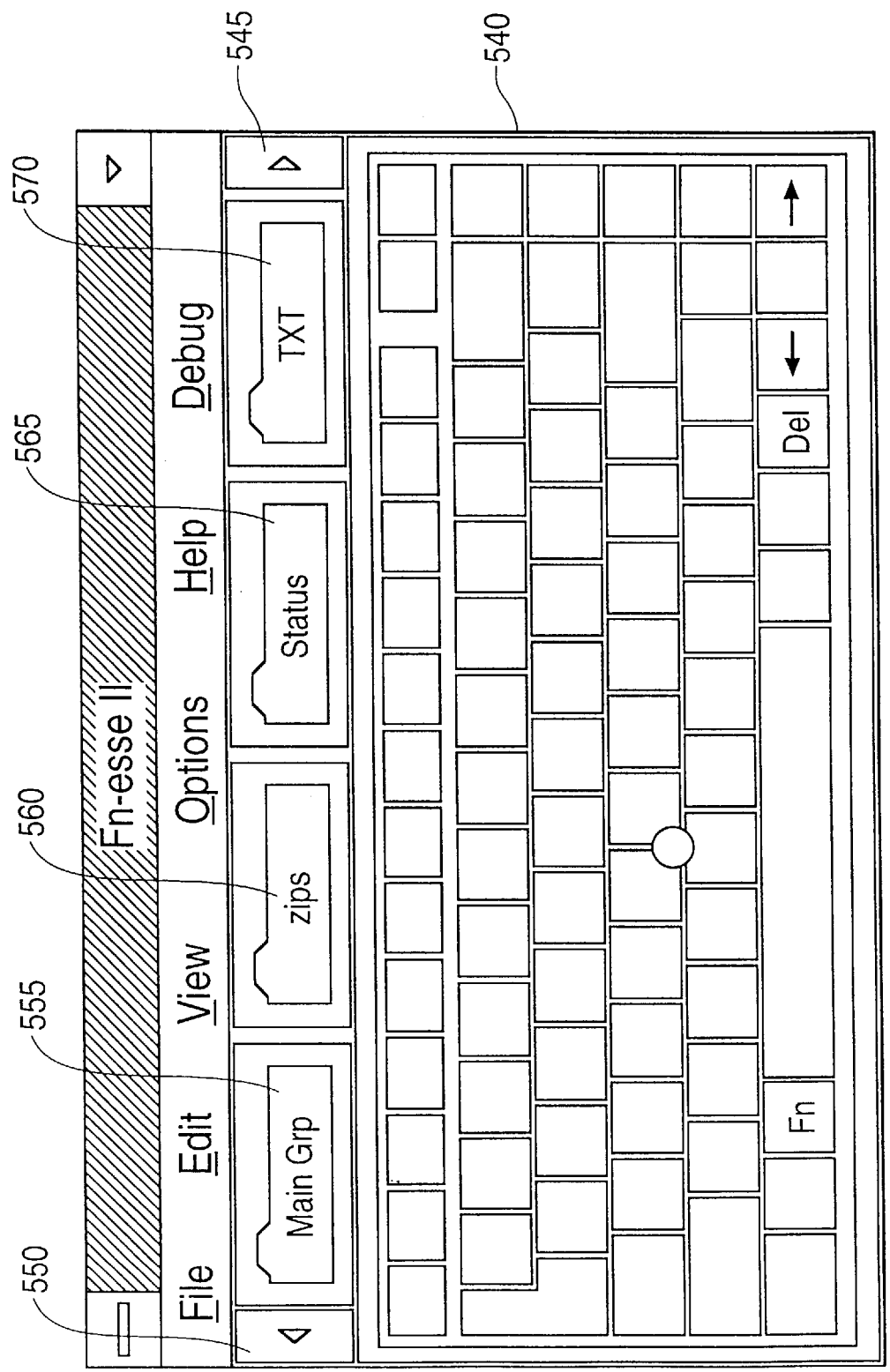
FIG. 5B is a representation of a GRP select view that may be selected in accordance with the present invention.

The "Custom Group" menu item enables/disables the GRP select view shown in FIG. 5B. The GRP select view 540 is displayed when enabled by the "Custom Group" menu item. When selected, the arrow keys 545, 550 scroll the virtual tabs 555, 560, 565, and 570 to a selected tab. The virtual tabs identify a custom group. Using the primary button of the pointing device 20, the user can drag a custom group onto a key to assign the custom group pop-up list to an FnKey. An undefined group cannot be assigned to an FnKey. Using the secondary button on the pointing device 20, the user invokes the EDIT GROUP PROPERTIES dialog described below with respect to FIGS. 13A and 13B. When the custom groups are scrolled to the left most group, the left scroll button 550 is disabled. When the custom groups are scrolled to the right most group plus one, the right scroll button 545 is disabled. This ensures that at least one unassigned GRP is always accessible. When the number of custom groups is less than four, both scroll buttons 545, 550 are disabled.

The "Status Bar" menu item enables/disables the status bar to be displayed. The status bar can be displayed at the bottom of the screen and provides the user with guidance information. All optional panes (Toolbar, Status Bar, etc.) are displayed when the "All" menu item is enabled and not displayed when the "None" menu item is selected.

Additional optional settings may be accessed using the Options menu item 230. The Options menu item 230 presents the user with a list or nesting of lists or a user dialog of all configurable options to select from. The list presented may display each available option with a check to indicate the current state of the option.

Figure 6A:
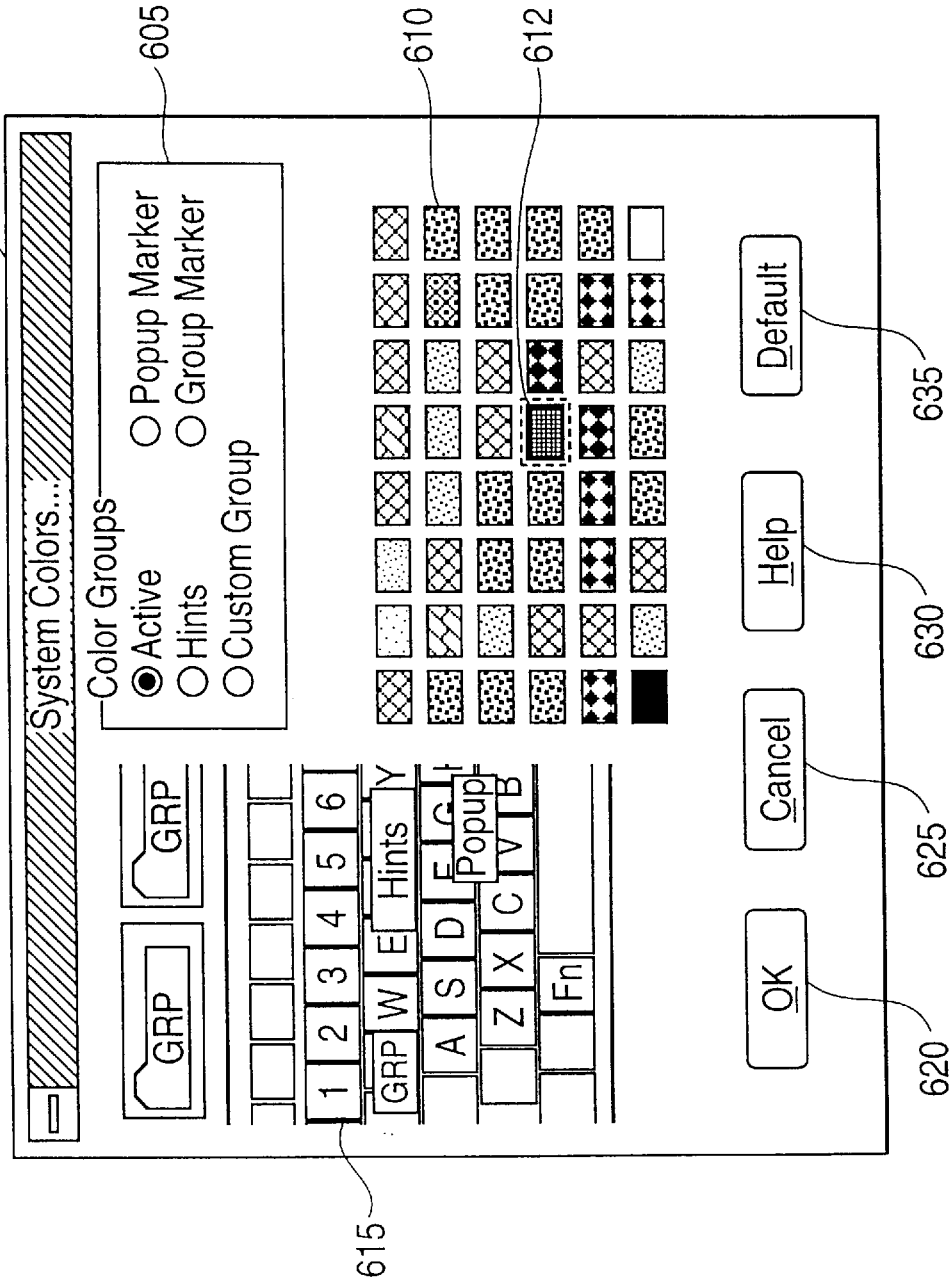
FIG. 6A provides an example of a SYSTEM COLORS dialog that may be selected in accordance with the present invention.
Figure 6C:
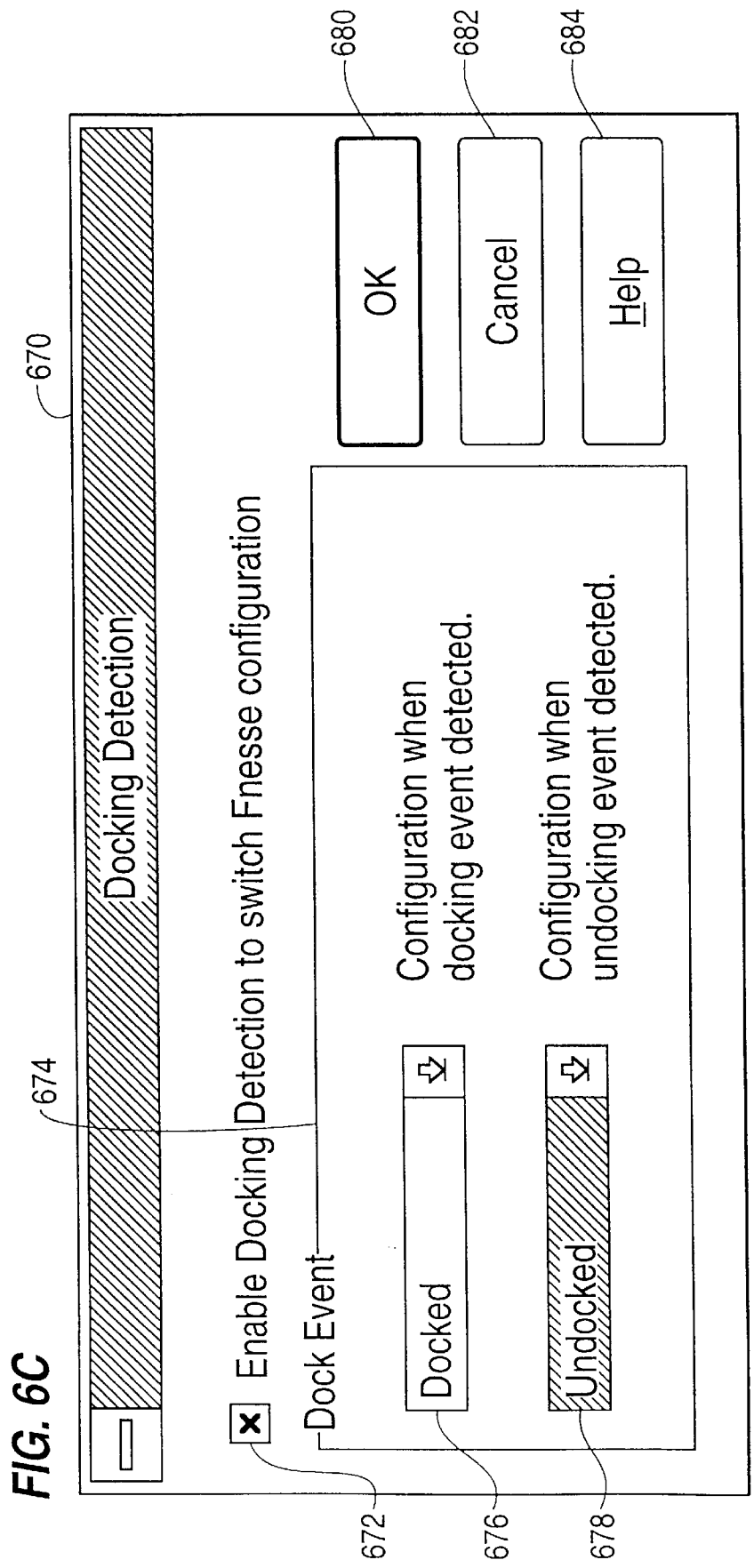
FIG. 6C is a representation of a screen displayed when a DOCKING DETECTION dialog is selected according to the present invention.

A "Colors" menu item, when selected, invokes a SYSTEM COLORS dialog, for example as shown in FIG. 6A. The user may set colors (e.g, highlight, mark) of the keycaps 210 for the current CFG and other system colors (GRP/CFG). As noted above, the use of colors provides the user with additional information about the currently assigned keys and the keys which are not assignable.

A SYSTEM COLORS dialog box 600 includes "Color Groups" radiobuttons which are used to select the context of the changes to occur. Prior to selecting a color, the user must select a radio button. The categories of color selection in "Color Groups" radiobuttons 605 include active to indicate keys which are currently bound, hints to provide pop-up hints background color, pop-up marker to enable the user to control whether keys corresponding to pop-up lists will be marked, group marker to provide a pop-up group list marker, and Custom Group tab text to provide a color for GRP folders in the tab text. A pop-up hint provides a short message description indicating the purpose or the application associated with a particular keycap when the cursor is positioned over the keycap for a predetermined time and is enabled/disabled in accordance with the "Show Hints" menu item which can be selected from the "Options" menu 230. A status line may be used to provide the user with more detailed information about the currently focused FnKey binding. This may be done by moving the pointing device over the key or by pressing the corresponding keyboard key.

The "Color Palette" 610 provides a palette of predefined colors for the user to select from for use with the current color context to update the "Color Keyboard" 615. The user may move a selection box 612 from color to color. An "OK" button 620 is used to accept the color in selection box 612. A "Cancel" button 625 discards any color changes that have been made. A "Help" button 630 provides context sensitive help information. A "Default" button 635 changes all the color assignments to the default state. The "Color Keyboard" 615 provides a visual indication of the system configuration. As the user changes the color selections, the "Color Keyboard" 615 feeds back the changes in display form.

The Options menu item 230 may also permit the user to control whether the always on top feature is enabled or disabled and whether minimize on use is enabled or disabled. The always on top feature ensures that a particular screen is not obscured by any other screen. The minimize feature permits an icon of the application to be displayed at, for example, the lower portion of the screen. Further, a "Hide on FnTAB" option may be provided to enable or disable the hiding of the FnKey application control when the FnTAB combination is pressed. Accordingly, hiding the FnKey application control can reduce clutter on the display. The current screen placement may be retained as the user moves an icon representing the FnKey application around on the desk top. Accordingly, the next time the application runs, it restores itself to the previous location.

A Confirm option may be provided to enable the user to present a KEY ASSIGNMENT CONFIRMATION dialog box 660 as shown in FIG. 6B in response to any key binding change. For example, if a key binding change occurs, the KEY ASSIGNMENT CONFIRMATION dialog box 660 indicates the previous assignments 661 and the new assignments 662. An "OK" button 663 may be used to accept the parameters selected. Alternatively, the user may cancel the change of assignment by actuating a "Cancel" button 664. A "Help" button 665 provides context sensitive help information.

A "Docking Support" option allows the user to select the automatic configuration mode for setting the FnKey assignments. A DOCKING DETECTION dialog shown in FIG. 6C enables/disables the docking event detection processing. When the "Docking Support" option is enabled, the FnKey application control periodically checks the dock state and switches to the appropriate CFG responsive to a dock/undock state change. In addition, if enabled during start-up, the CFG switches reflect the static state of the machine (docked or undocked). When the "Docking Support" option is disabled, the dock state is not detected and the CFG is not changed based on a dock/undock state change.

An "Enable Docking Detection" checkbox 672 in DOCKING DETECTION dialog box 670 may provide control for the user to enable/disable docking event detection processing depending on the checked status of the checkbox, e.g., checked=enabled. A Dock Event box 674 includes a "Docked" combobox 676 and an "Undocked" combobox 678, each with a dropdown list for selecting the CFG from a currently defined list of CFGs when a dock event and an undock event, respectively occur. An "OK" button 680 may be used to accept the parameters selected. Alternatively, the user may cancel the change of assignment by actuating a "Cancel" button 682. A "Help" button 684 provides context sensitive help information.

A launch notification option can provide a function of enabling/disabling a launch notification feature. When enabled, this option displays a pop-up notification dialog that indicates that an application has been launched. Consequently, a user can be alerted that a new application rather than the previous application is being launched.

A "Help" menu item 235 may be provided in the main screen of FIG. 2 to provide an on-line hypertext help system and other information. The help system is intended to provide the user with guidance in operating the system. The "Help" menu item 235 may provide the user with a list of user configurable options. For example, a "Contents" menu may provide the user with a help index of key words and a "Search for Help on" menu may present the user with a dialog to search for a specific help topic. In addition, the "Help" menu item 235 may present the user with access to an ABOUT dialog (not shown) that provides standard information, such as the current version of the application. Further information about the internal state of the FnKey application control may also be presented (e.g., number of keys assigned, etc.) with the ABOUT dialog.

While not shown, main screen 200 may provide a quit menu item that enables the user to quit the Windows™ operating environment. For example, when the quit menu item is pressed, a user dialog (not shown) may be provided to enable the user to select among the options of exiting the FnKey application, quitting the Windows™ operating environment, restarting the Windows™ operating environment, and cancelling the pop-up list selection.

FIG. 7 illustrates an ASSIGNMENT TYPE dialog box 700 for implementing an ASSIGNMENT TYPE dialog that can help avoid confusion that may occur when a user edits a key assignment. The ASSIGNMENT TYPE dialog permits the user to select whether an FnKey combination launches an application directly or invokes a pop-up list for launching applications indirectly. The ASSIGNMENT TYPE dialog may include a "Direct" button 710, a "Pop-up" button 720, a "Cancel" button 730, and a "Help" button 740.

The "Direct" button 710 allows the user to assign an application to be launched directly when a selected FnKey combination is pressed. The "Pop-up" button 720 allows the user to assign a pop-up list to a selected FnKey combination. The "Cancel" button 730 cancels the key editing operation initiated and returns to the previous screen. The "Help" button 740 provides the user with context sensitive help information.

Figure 8:
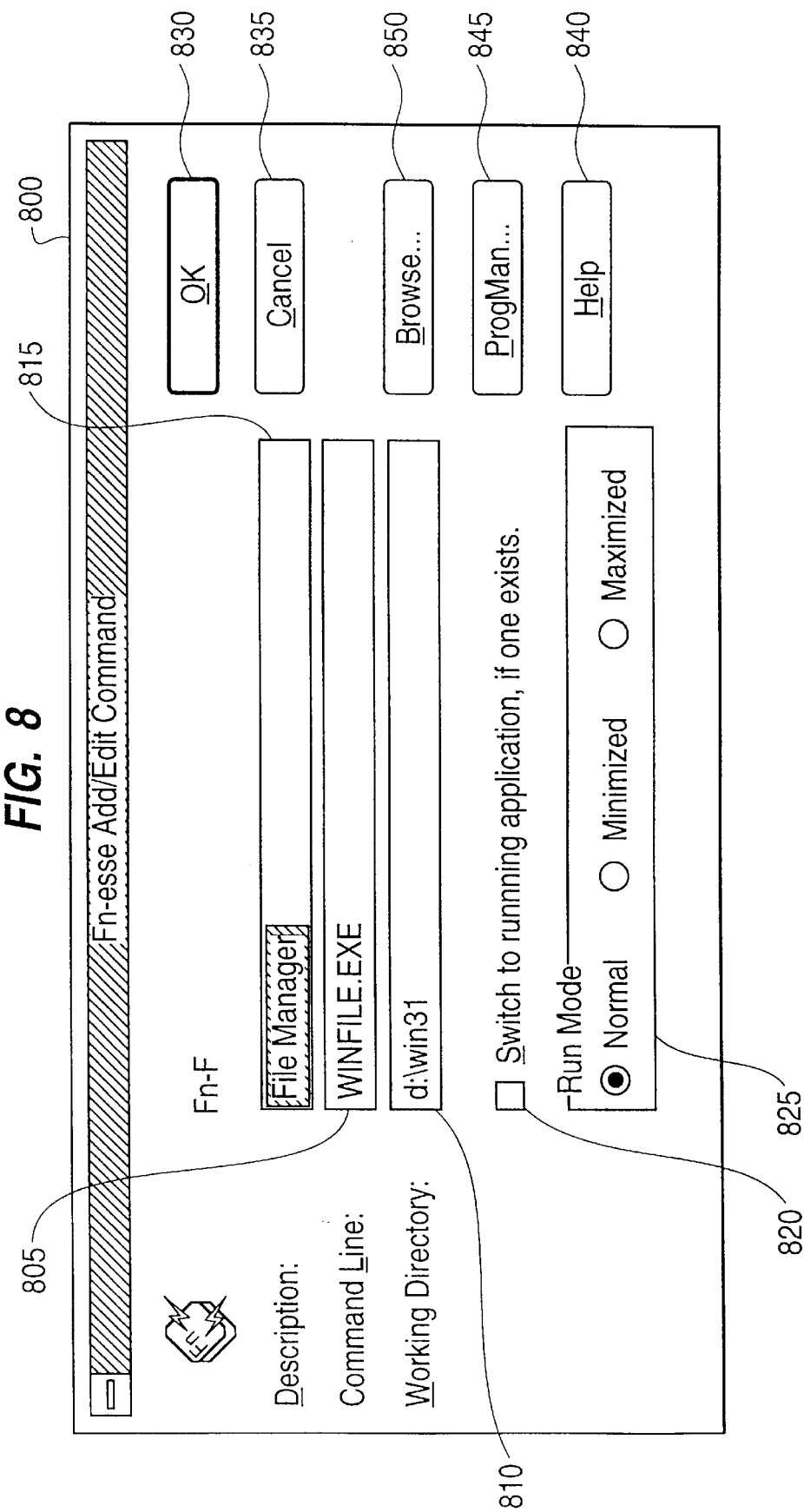
FIG. 8 is a representation of a screen displayed when an ADD/EDIT COMMAND dialog is selected according to the present invention.

An ADD/EDIT COMMAND dialog supports the assignment of an application to a particular key or combination of keys (i.e., a key binding) or the editing of a current key binding. FIG. 8 illustrates an exemplary ADD/EDIT COMMAND dialog box 800. Several user interface controls can be used in connection with the ADD/EDIT COMMAND dialog. The "Cmd" edit line 805 displays the command or the file associated with the current FnKey combination. The "Cwd" edit line 810 indicates the current working directory associated with the command. The FnKey application control will attempt to change to the current working directory of the "Cwd" edit line 810 before launching the application. The "Desc" edit line 815 shows the user friendly or commonplace description on the pop-up hint (or status line) when a keycap has the focus.

Each of edit lines 805, 810, and 815 can be accessed by moving the pointing device over the respective block or by using the arrow keys on the keyboard. Of course, other means may be provided to enable the user to access a particular line. The user may change the values in edit lines 805, 810, and 815 by typing a new value into the block. The "Switch to" checkbox 820, if enabled, instructs the FnKey application control to switch to a previous instance of the application if it is still running. Thus, if the application is running, but currently unavailable because, for example, it does not have the current focus, the application will be returned to. If the application is not running, the application is launched. Accordingly, this dual-mode feature serves to avoid multiple key strokes and/or pointing device selections. This option may be enabled by default.

A user can select the mode in which an application is launched by selecting one of the radiobuttons identifying the available run modes from the "Run Mode" box 825. The run modes available include normal (predefined screen size for particular application), minimized (run application in smallest portion of screen), and maximized (run application in entire or largest portion of screen).

An "OK" button 830 saves the parameters displayed in the ADD/EDIT COMMAND dialog box 800 to the dynamic key binding table, and exits the ADD/EDIT COMMAND dialog. The "Cancel" button 835 cancels any changes and restores the previous parameters to the FnKey assignment before exiting the ADD/EDIT COMMAND dialog. The "Help" button 840 may provide context sensitive help information.

The "Browse" button 845 presents the user with a BROWSE dialog for selecting a file to assign to the key binding. The BROWSE dialog is similar to the PROGMAN BROWSE dialog, discussed below and shown in FIG. 9, for running an application or for inserting an item into a group. In one embodiment, the "Browse" 845 button is not provided during drag-n-drop operations. Additional details concerning the BROWSE dialog will be discussed in connection with FIG. 10.

Figure 9:
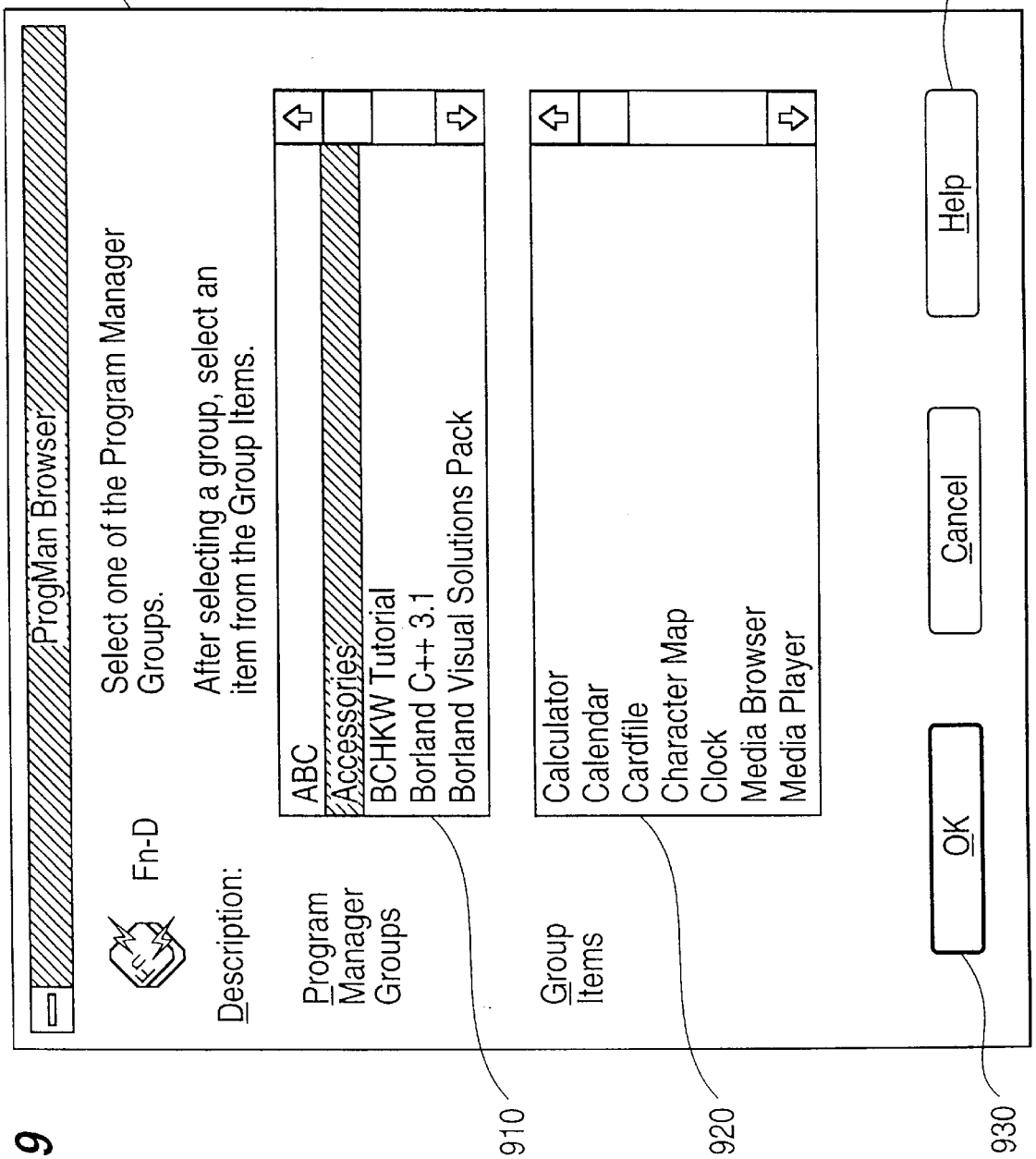
FIG. 9 provides a representation of a screen displayed when a PROGMAN BROWSER dialog is selected from the ADD/EDIT COMMAND dialog according to the present invention.

The "Progman" button 850 presents the user with a PROGMAN BROWSE dialog that allows the user to select an assignment that has been pre-configured and/or built from the PM (program manager) group database. According to one embodiment, the "Progman" button 850 is not provided during drag-n-drop operations. As illustrated in FIG. 9, the PROGMAN BROWSE dialog is carried out using PROGMAN BROWSE dialog box 900, as will be described in detail. The PROGMAN BROWSE dialog illustrated in FIG. 9 may be provided when the user selects a pop-up list to associate with the selected FnKey combination.

The PROGMAN BROWSE dialog box 900 includes several control features. The PROGMAN BROWSE dialog allows the user to bind the selected key with a Progman group or group item. This dialog operates in two modes. In the first mode, the user selects a specific group to bind an FnKey to a pop-up list, and in the second mode, the user selects a specific item from a group to bind directly to an FnKey.

The "Progman Manager Groups" listbox 910 contains a list of Program Manager groups. The user can select a group that they wish to associate with the FnKey combination if the first mode is desired. If the second mode is desired, the user selects an item from the group items associated with currently selected group which are displayed in a "Group Items" listbox 920. Alternatively, an "Enable selection" checkbox (not shown) may be provided. Items in the "Group Items" listbox 920 may be disabled for individual selection (first mode desired) unless the "Enable selection" checkbox is checked (second mode desired).

A description edit line (not shown) may be used to place a user friendly description that is associated with the application/pop-up list. An "OK" button 930 is used to save the parameters that have been selected to the dynamic key binding table and return control to the previous context. The "OK" button 930 is only enabled when, given the context, a proper selection is made. A "Cancel" button 940 discards any changes that have been made to the dialog and returns control to the previous context. A "Help" button 950 may provide context sensitive help information. According to another embodiment of the PROGMAN BROWSER dialog, when the user selects an application for launching directly, a command edit line (not shown) presents the actual command used by the FnKey application control to launch the application.

Figure 10:
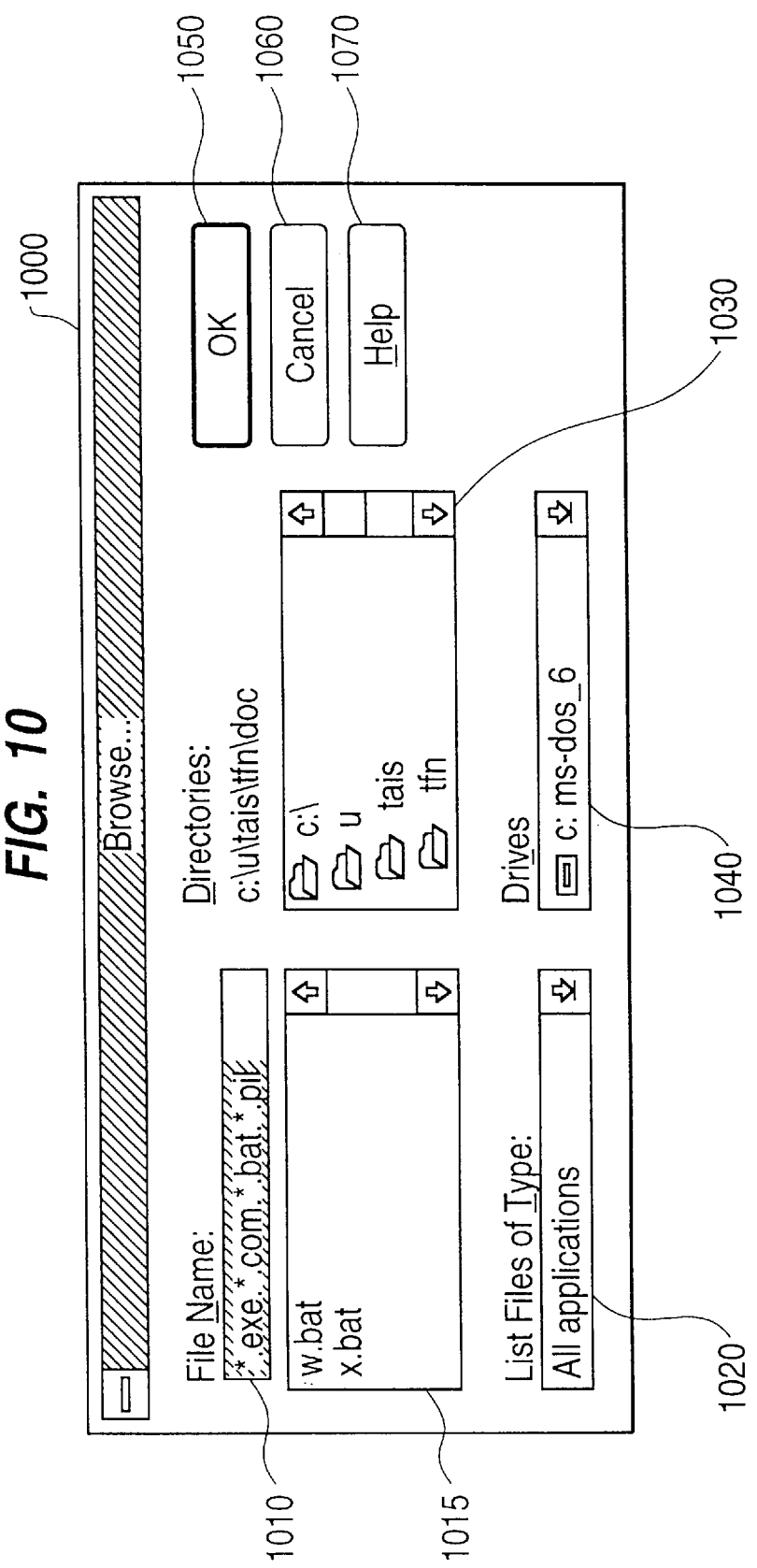
FIG. 10 is a representation of a screen displayed when a BROWSE dialog is selected from the ADD/EDIT COMMAND dialog according to the present invention.

The BROWSE dialog will now be described in connection with the BROWSE dialog box 1000 illustrated in FIG. 10. The BROWSE dialog allows the user to associate the selected FnKey with a file. This file is used with the operating system registration database, e.g., the Windows™ registration database, to launch a file that requires an application (i.e., associate an application with a filename extension). As noted above, the BROWSE dialog is very similar to the PROGMAN BROWSE dialog for running an application.

A BROWSE dialog box 1000 offers several control features. A "File Name" edit line 1010 may be used to select the filename. A "File Name" listbox 1015 displays the filenames in the current directory that match the parameter of the "File Name" edit line 1010. A "List of File Type" combobox 1020 is a dropdown combobox that presents the user with pre-defined filename extension types. A directory to find the file may be selected using a "Directories" listbox 1030. A "Drives" combobox 1040 may be used to select a drive to find a particular file. An "OK" button 1050 accepts the parameters that have been selected and returns to the previous context. A "Cancel" button 1060 discards any changes that have been made to the BROWSE dialog and returns to the previous context. Finally, a "Help" button 1070 provides context specific help information.

Figure 11:
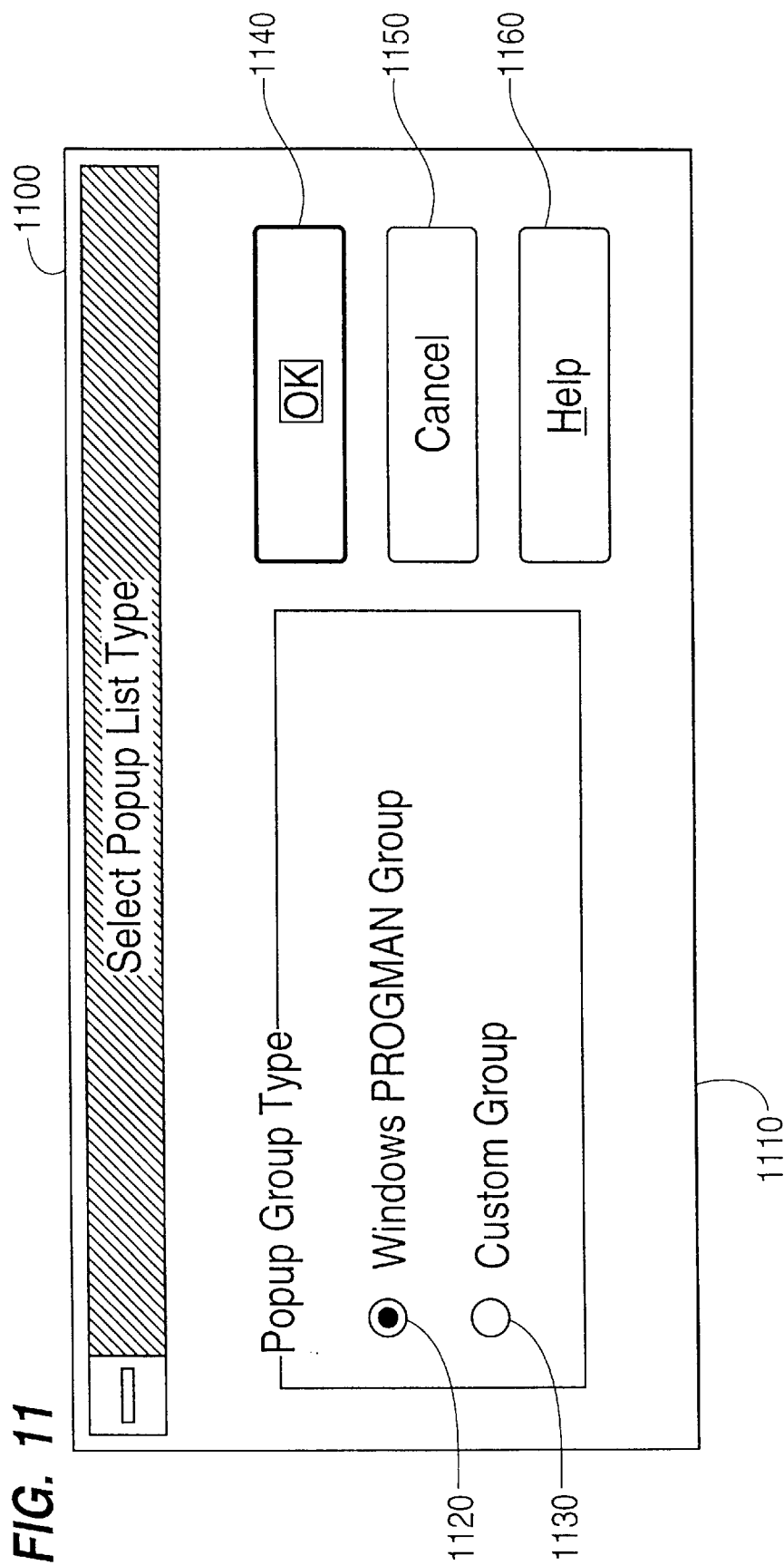
FIG. 11 is a representation of a screen displayed when a SELECT POPUP LIST TYPE dialog is selected according to the present invention.

When an FnKey is to be assigned to pop-up a list that is used to launch an application, for example by actuation of button 720 in ASSIGNMENT TYPE dialog 700 in FIG. 7, a SELECT POPUP LIST TYPE dialog as shown in FIG. 11 may be used. The SELECT POPUP LIST TYPE dialog box 1100 includes a "Popup Group Type" list box 1110 containing a "Progman" radiobutton 1120 and a "Custom Group" radiobutton 1130. When enabled, the "Progman" radiobutton 1120 causes a pop-up list based on the PROGMAN database to be selected. A pop-up list based on the locally managed custom group database is selected when the "Custom Group" radiobutton is enabled. An "OK" button 1140 accepts the pop-up group type that has been selected and returns control to the appropriate context. A "Cancel" button 1150 discards any changes that have been made and returns to the previous context. A "Help" button 1160 provides context specific help information.

Figure 12:
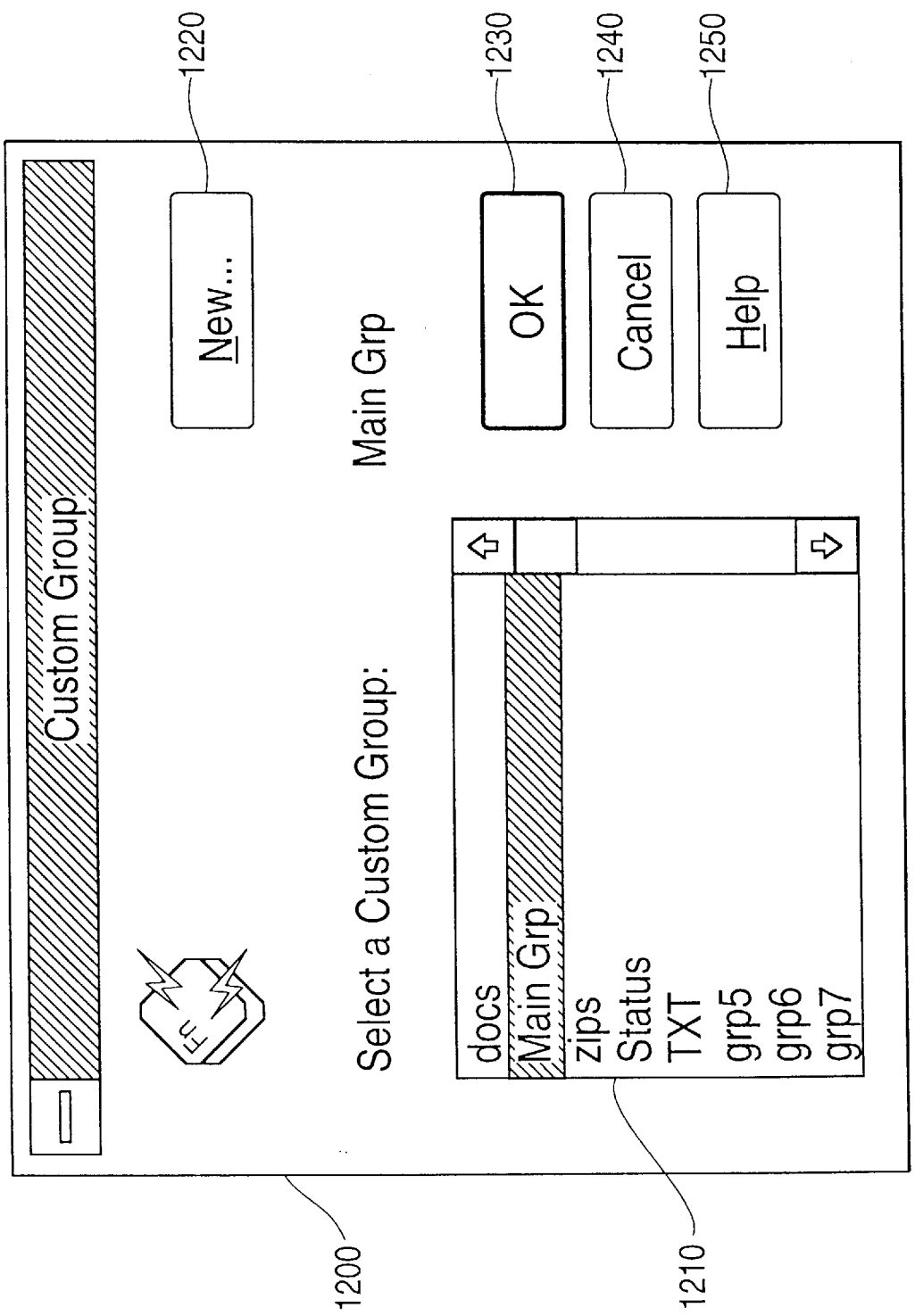
FIG. 12 is a representation of a screen displayed when a CUSTOM GROUP dialog is selected from the SELECT POPUP LIST TYPE dialog according to the present invention.

To select a group for assignment to an FnKey, for example responsive to acceptance of a locally managed custom group as provided with respect to the SELECT POPUP LIST TYPE dialog of FIG. 11, a CUSTOM GROUP dialog as shown in FIG. 12 may be used. The CUSTOM GROUP dialog box 1200 includes a "GRP" list box 1210 which displays a list of all defined GRPs. The user actuates a "NEW" button 1220 to create a new group and control shifts to another context, for example the EDIT GROUP PROPERTIES dialog discussed with reference to FIGS. 13A and 13B. A GRP is selected by moving the cursor over the desired GRP in the "GRP" listbox 1210 and actuating the "OK" button 1230 which accepts the parameters that have been selected and returns control to the previous context. A "Cancel" button 1240 discards any changes that have been made and returns to the previous context. A "Help" button 1250 provides context specific help information.

The EDIT GROUP PROPERTIES dialog is used to add/edit the selected local GRP. There are two mutually exclusive versions of this dialog, static as represented by dialog box 1301 in FIG. 13A and dynamic as represented by dialog box 1302 in FIG. 13B, selectable by the "Group Type" radiobuttons 1305. A static custom group is a manually maintained list of applications/documents. A dynamic custom group uses a specified directory and file pattern to scan a directory and pop-up a list of qualified documents.

Figure 13A:
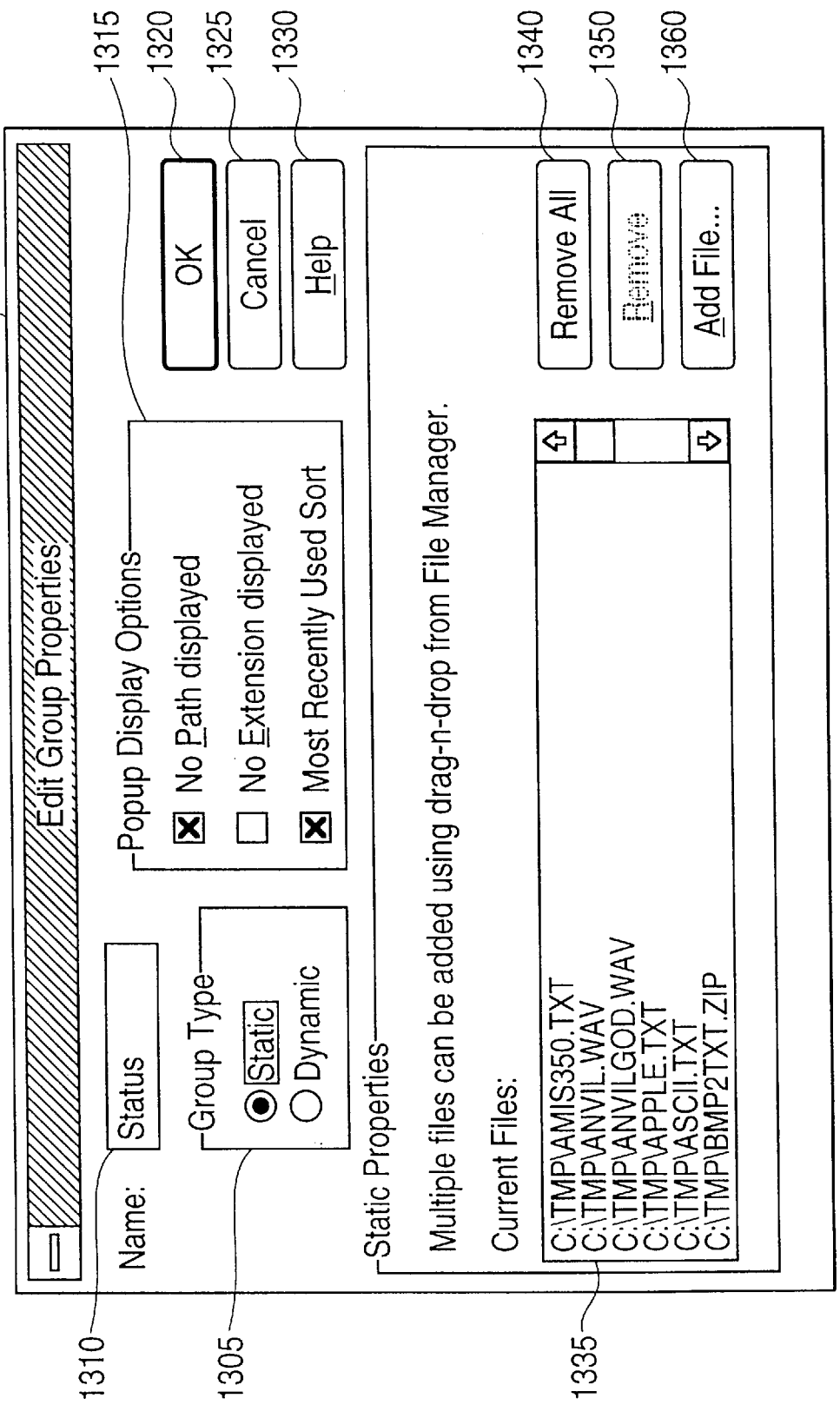
FIG. 13A is a representation of a screen displayed when a static type group EDIT GROUP PROPERTIES dialog is selected according to the present invention.
Figure 13B:
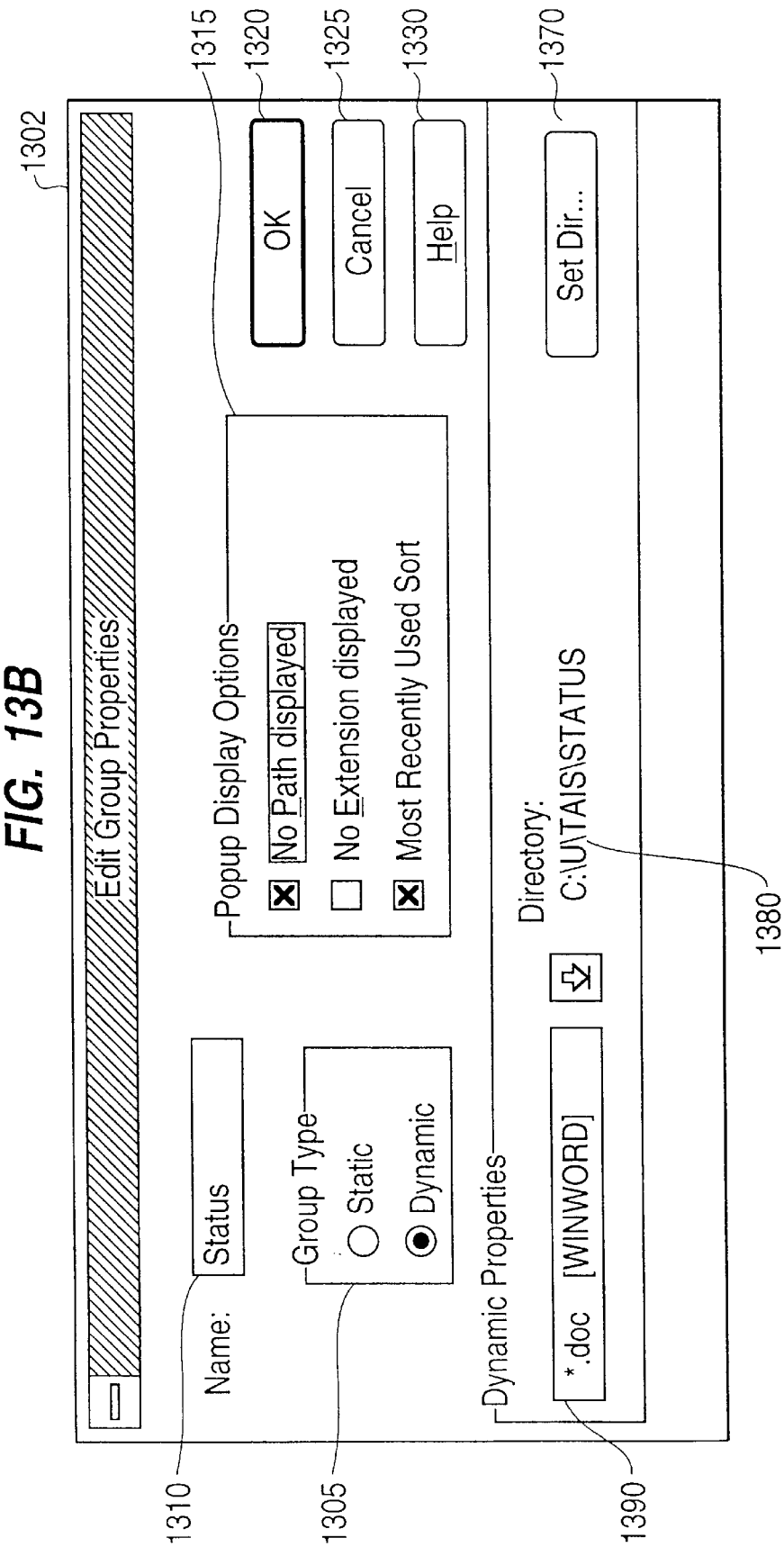
FIG. 13B is a representation of a screen displayed when a dynamic type group EDIT GROUP PROPERTIES dialog is selected according to the present invention

Reference numerals common to FIGS. 13A and 13B represent the same elements. A "Name" edit line 1310 displays the name of the current user defined GRP and can be changed by typing a new name to another defined GRP. A "Popup Display options" checkbox 1315 may provide three display options. A no path option, if selected, prevents the pop-up menu from displaying the path portion of the file. A no extension option, if selected, prevents the pop-up menu from displaying the extension portion of the file. A most recently used sort option, if selected, sorts the pop-up list in, for example, reverse chronological order based on when last used. An "OK" button 1320 accepts the parameters that have been selected and returns control to the previous context. A "Cancel" button 1325 discards any changes that have been made and returns to the previous context. A "Help" button 1330 provides context specific help information.

In FIG. 13A, a "Current Files" listbox 1335 contains the current list of file items in the GRP. The files are displayed in a comprehensive list. Existing files may be displayed in upper case and newly added files can be displayed in lower case. A "Remove All" button 340 and a "Remove" button 350 remove all the items and the items selected, respectively, from the "Current Files" listbox 1335. Actuation of an "Add File" button 1360 invokes the browse for applications dialog (e.g., the BROWSE dialog described with reference to FIG. 10) which enables the user to add a file to the pop-up list.

In FIG. 13B, actuation of a "Set Dir" button 1370 invokes a browse for drive/directory dialog from which a drive and directory are selected. The "Current Directory" static text 1380 displays the currently selected directory/drive specifier. A "File Pattern" combobox 1390 contains a dropdown list and an edit control. The dropdown list contains all document extensions registered in the WIN.INI file. In addition, the document extensions are suffixed with the registered application type to provide the user with an indicator to which application will be launched. After selecting a file pattern, a user may further qualify the search by editing the edit line directly for the preferred files to be presented in the pop-up list. The default file type may be *.TXT and the default directory may be the Windows™ home directory.

Figure 14:
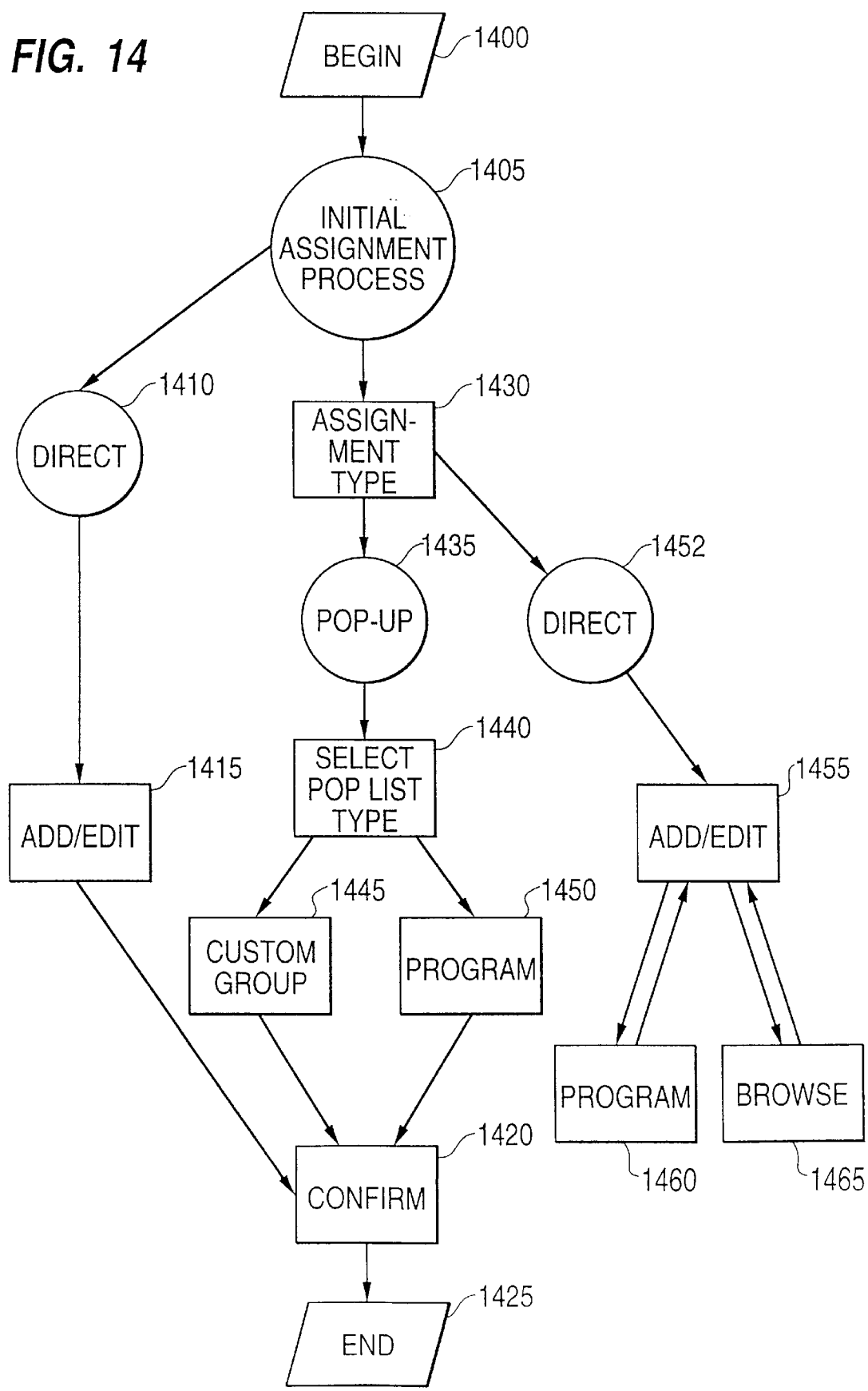
FIG. 14 depicts a flow chart illustrating one operation sequence for assigning an application, file, or pop-up list to a particular key in accordance with the present invention.

User interaction with the FnKey application control will now be described with reference to FIG. 14. A start block 1400 is provided to signify the start of the key assignment procedure. As discussed above, a key assignment may be implemented from any one of a variety of processes. For the sake of convenience, these processes are indicated as an initial assignment process 1405. For example, the initial assignment process may occur in an application that supports drag-n-drop selection, irrespective of the active application when an unassigned FnKey combination is pressed, when the secondary button on the pointing device 20 is clicked while the cursor is positioned over a keycap of the main screen 200, or when the "Edit" button is pressed while in the FUNCTION KEY ASSIGNMENTS dialog, among other possibilities.

When the drag-n-drop assignment feature is implemented, a direct assignment process occurs as indicated by box 1410. That is, when an icon corresponding to an application for assignment is moved over a keycap on a virtual keyboard display, the application is assigned to the keycap. The ADD/EDIT COMMAND dialog box is displayed at 1415. The user can then view the parameters of the application and keycap assignment. After the ADD/EDIT COMMAND dialog is exited, the selection may be confirmed at box 1420 using the KEY ASSIGNMENT CONFIRM dialog, if enabled. If confirmed, or if the KEY ASSIGNMENT CONFIRM dialog is disabled, the selected application is assigned to the selected FnKey combination, and the assignment process ends at box 825.

Alternatively, when an assignment proceeds by clicking the secondary button on the pointing device 20 while the cursor is positioned over a keycap of the virtual keyboard, when an unassigned FnKey combination is pressed, or when the "Edit" feature is implemented, for example, the user is presented with the ASSIGNMENT TYPE dialog, as indicated at box 1430. If the user selects the "Pop-up" feature 1435 of the ASSIGNMENT TYPE dialog, the SELECT POPUP LIST TYPE dialog 1440 is presented to the user. The user can then select to customize a group by which the CUSTOM GROUP dialog is presented to select a user defined group for assignment to a key binding at box 1445. Also, the user may select an application or file for binding to an FnKey combination using the PROGMAN dialog presented to the user at 1450. Confirmation of the key binding at box 1445 and 1450, if enabled, is accomplished by the KEY ASSIGNMENT CONFIRM dialog at 1420, and the assignment procedure ends at 1425.

If the "Direct" feature at 1452 is selected from the ASSIGNMENT TYPE dialog, the ADD/EDIT COMMAND dialog is presented to the user at 1455. From the ADD/EDIT COMMAND dialog, the user may select an application or file for binding to an FnKey combination, possibly using the PROGMAN dialog at 1460 or the BROWSE dialog at 1465. Upon exiting the ADD/EDIT COMMAND dialog, the user is requested to confirm the selection using the KEY ASSIGNMENT CONFIRM dialog at 1420, and the assignment process ends at 1425.

The user may additionally launch applications using the keyboard 10 and the pointing device 20. If the FnKey combination on keyboard 10 is disabled, the disabled FnKey combination is not received by the user interface. Accordingly, no action is taken. When an FnKey combination is pressed and the FnKey combination is not currently assigned, the user may be presented with the ASSIGNMENT TYPE dialog as discussed above in connection with FIGS. 14. The user may then choose an application to associate with the FnKey combination.

If the FnKey combination is currently assigned to a single application, the application is launched either directly or via the operating system registration database in the event that another application is required. If the FnKey combination is associated with a pop-up list, the pop-up list is displayed to enable the user to select an application for launching. The selected application is then launched. During the launching of an application, the FnKey application control can set its cursor to the standard Windows™ Hourglass cursor to indicate to the user that a lengthy operation is in progress.

Communications with the FnKey application control can be performed equally well using the pointing device 20. In fact, use of a pointing device 20 with the FnKey can produce several functional advantages. For example, when an FnKey combination is bound to an associated application or pop-up list, all that is necessary to launch the application/list is to place the cursor over the keycap and press, e.g., the primary button of the pointing device. In the event that there is no current key binding, the Assignment Type dialog is invoked and the user is able to edit the current key binding as discussed above in connection with FIG. 14.

Even when an FnKey is bound, the user may edit the key binding by placing the pointer over the keycap and pressing, e.g., the secondary button of the pointing device. After detection of the secondary button, the Assignment Type dialog box is displayed and the user may thereafter edit the key binding for the selected keycap as discussed above.

One embodiment of the present invention is the Fn-esse II™ application by Toshiba America Information Systems. However, many variations of the present invention may be implemented. For example, additional FnKeys may be provided to increase the number of functions supported or to more easily distinguish between available functions. Also, the FnKey 15 can be used in combination with more than one standard key 12 for even greater flexibility. Further, the various screens may be varied and/or features may be selected in alternative manners. In addition, the present invention may be used not only for launching applications, but more generally for executing any user-assigned action. Also, each Fnkey combination can be assigned to launch a series of applications responsive to a single activation. Thus, a sequence of applications can be associated with a key combination for a configuration.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

What is claimed is:

1. A method for dynamically configuring a physical keyboard connected to a computer based on a location of the computer, said method comprising the steps of:

determining the location of the computer using triangulation;

assigning a keyboard configuration associated with the keyboard based on the location of the computer; and automatically reconfiguring said keyboard configuration based on the location of the computer to provide a different keyboard configuration, an appearance of the keyboard not being dependent upon said keyboard configuration.

2. The method of claim 1 further including the step of detecting docking/undocking of the computer, wherein said step of automatically reconfiguring further includes automatically reconfiguring said keyboard configuration based on the docking/undocking of the computer.

3. The method of claim 1 further including the step of detecting insertion/removal of a disk, wherein said step of automatically reconfiguring further includes automatically reconfiguring said keyboard configuration based on the insertion/removal of the disk.

4. The method of claim 1, further comprising the steps of:
binding a key combination to an action based on the selected keyboard configuration; and
storing in a look-up table, the key combination and information for executing said action of the selected keyboard configuration.

5. The method of claim 4, wherein said action is an application and said information for executing said action is information for launching said application.

6. The method of claim 1, wherein said step of determining the location of the computer is performed using a global positioning system device.

7. In a computer system comprising a display, a physical keyboard having a set of keys, and a computer coupled to the keyboard, a method for defining a plurality of keyboard configurations, wherein one of said keyboard configurations is selected based on a location of the computer, said method comprising the steps of:
prompting a user to select a first keyboard configuration and an action for binding to a key combination for said first keyboard configuration;
first storing in a first configuration memory area, responsive to a user's selection, the key combination and information for executing the user-selected action for said first keyboard configuration;
prompting a user to select a second keyboard configuration and an action for binding to a key combination for said second keyboard configuration;
second storing in a second configuration memory area, responsive to the user's selection, the key combination and information for executing the user-selected action for said second keyboard configuration;
determining the location of the computer using triangulation; and
third storing one of said first and second keyboard configurations in a keyboard look-up table based on the location of the computer
an appearance of the keyboard not being dependent upon said keyboard configurations.

8. The method of claim 7, wherein each step of prompting comprises displaying an ADD/EDIT dialog box on said display.

9. The method of claim 7, further including the step of prompting a user to enable event detection, wherein said step of determining the location of the computer is responsive to enabled event detection.

10. The method of claim 7, wherein said action is an application, said information for executing an application is information for launching an application.

11. The method according to claim 10, wherein each step of prompting responds to the depression of said key combination when said respective configuration memory area does not contain an action corresponding to said key combination.

12. The method of claim 11, wherein each step of prompting comprises invoking an ADD/EDIT dialog using said display to enable the user to select the application for binding to said key combination.

13. The method of claim 11, wherein said step of invoking an ADD/EDIT dialog includes enabling the user to select any application from a listing of applications.

14. The method of claim 11, wherein:
each step of prompting is responsive to a user's request to edit an existing configuration; and
first and second storing comprises replacing information for executing the existing action for a key combination of the existing configuration in said respective configuration memory area with information for launching an application of the key combination of a configuration newly selected by the user.

15. The method of claim 11, wherein said first and second steps of storing comprise storing in said first and second configuration memory areas said key combination and information for launching a plurality of applications of said first and second keyboard configurations, respectively.

16. The method of claim 7, wherein said step of determining the location of the computer is performed using a global positioning system device.

17. A computer system comprising a physical keyboard having a set of keys and a computer coupled to said keyboard, said computer comprising:
an event detecting interface for determining a location of the computer using triangulation and generating event status information;
configuration memory for storing a plurality of different keyboard configurations represented by a keyboard configuration information, wherein each keyboard configuration includes key binding with a plurality of key combinations being bound to a different action and information for executing the action;
a configuration interface, responsive to said event status information, for retrieving keyboard configuration information according to the location of the computer from said configuration memory;
key application control, configured to receive the keyboard configuration information, for automatically changing an active keyboard configuration to a keyboard configuration associated with the location of keyboard, an appearance of the keyboard not being dependent upon the keyboard configurations; and
a look-up table, responsive to said key application control, for storing said keyboard configuration.

18. The computer system according to claim 17, further comprising a docking port, coupled to said event detecting interface, for connecting said computer to a network, wherein said event detecting interface further detects a docking state of said computer.

19. The computer system according to claim 17, wherein said information for executing the action comprises information for launching an application.

20. The computer system according to claim 17, further comprising:
a user interface, coupled to said keyboard, for sensing depression of a key combination, wherein said key application control determines from said look-up table the information for executing the action corresponding to the depressed key combination sensed by said user interface; and
an operating environment for executing the action based upon the determined information.

21. The computer system according to claim 20, wherein said information for executing the action comprises information for launching an application.

22. The computer system according to claim 21, further comprising:
a pop-up list database for storing information for launching a plurality of applications corresponding at least one of said key combinations of the keyboard configuration associated with the location of the computer; and
a display for displaying a pop-up list of applications stored in said pop-up list database for selection by the user, wherein said operating environment launches the application selected by the user from said pop-up list.

23. The computer system of claim 17, wherein said event detecting interface is configured to determine the location of the computer using a global positioning system device.

24. The computer system of claim 17, wherein said event detecting interface further detects a docking/undocking event.

25. In a computer system comprising a display, a physical keyboard having a set of keys, and a computer coupled to the keyboard, wherein an action is executed responsive to a depression of a key combination on the keyboard, a method for dynamically configuring the keyboard, said method comprising the steps of:

determining a location of the computer using triangulation;

generating event status information based on the location of the computer; and automatically reconfiguring said keyboard responsive to the event status information to provide a different keyboard configuration, an appearance of the keyboard not being dependent upon the keyboard configuration.

26. The method of claim 25, wherein said step of determining the location of the computer is performed using a global positioning system device.

27. The method of claim 25, further including the step of detecting a docking/undocking event, wherein the step of automatically reconfiguring further includes automatically reconfiguring said keyboard configuration based on the docking/undocking event.

28. The method of claim 25, further including the step of detecting insertion/removal of a peripheral element, wherein the step of automatically reconfiguring further includes automatically reconfiguring said keyboard configuration based on the insertion/removal of the peripheral element.

* * * * *